(12) United States Patent
Yoshida et al.

(10) Patent No.: US 12,234,339 B2
(45) Date of Patent: Feb. 25, 2025

(54) CONDUCTIVE RESIN, MANUFACTURING METHOD FOR THE SAME, AND SENSOR

(71) Applicant: National University Corporation Yamagata University, Yamagata (JP)

(72) Inventors: Ayako Yoshida, Yamagata (JP); Yi-Fei Wang, Yamagata (JP); Shizuo Tokito, Yamagata (JP)

(73) Assignee: National University Corporation Yamagata University, Yamagata (JP)

( * ) Notice: Subject to any disclaimer, the term of this patent is extended or adjusted under 35 U.S.C. 154(b) by 20 days.

(21) Appl. No.: 18/318,184

(22) Filed: May 16, 2023

(65) Prior Publication Data

US 2023/0323067 A1 Oct. 12, 2023

Related U.S. Application Data

(63) Continuation of application No. PCT/JP2021/041218, filed on Nov. 9, 2021.

(30) Foreign Application Priority Data

Nov. 27, 2020 (JP) .................................. 2020-197319

(51) Int. Cl.
 *C08J 9/28* (2006.01)
 *C08J 3/28* (2006.01)
 *C08J 9/00* (2006.01)

(52) U.S. Cl.
 CPC . *C08J 9/28* (2013.01); *C08J 3/28* (2013.01); *C08J 9/0023* (2013.01); *C08J 9/0028* (2013.01); *C08J 2383/04* (2013.01)

(58) Field of Classification Search
 CPC .......................................................... C08J 9/28
 See application file for complete search history.

(56) References Cited

U.S. PATENT DOCUMENTS

| | | | | |
|---|---|---|---|---|
| 2004/0041240 A1* | 3/2004 | Farnworth | ........ | H01L 21/02345 257/E21.273 |
| 2009/0301876 A1* | 12/2009 | Wagner | .................. | G01N 27/30 204/415 |
| 2009/0305135 A1* | 12/2009 | Shi | .......................... | H01M 4/13 429/231 |

(Continued)

FOREIGN PATENT DOCUMENTS

| CN | 110698717 A | 1/2020 |
|---|---|---|
| CN | 111073024 A | 4/2020 |

(Continued)

OTHER PUBLICATIONS

ISR cited in PCT/JP2021/041218 dated Jan. 25, 2022.

*Primary Examiner* — William D Young
(74) *Attorney, Agent, or Firm* — BACON & THOMAS, PLLC

(57) ABSTRACT

Porous conductive resin is produced by: mixing a hydrogen bond donor compound and a hydrogen bond acceptor compound to produce deep eutectic liquid (DEL); adding conductive materials to the DEL to produce gel; adding resin that is insoluble in the DEL to the gel to produce ink made of the gel dispersed in the resin; forming the produced ink into a formed object having a desired shape; curing the resin in the formed object; and evaporating the DEL in the formed object including the cured resin.

2 Claims, 24 Drawing Sheets

(56) References Cited

U.S. PATENT DOCUMENTS

| | | | | |
|---|---|---|---|---|
| 2010/0187484 A1* | 7/2010 | Worsley | ............ | H01G 11/56 |
| | | | | 977/932 |
| 2011/0024698 A1* | 2/2011 | Worsley | ............ | B82Y 30/00 |
| | | | | 252/511 |
| 2015/0004327 A1* | 1/2015 | Yamamoto | ............ | H05K 1/11 |
| | | | | 174/253 |

FOREIGN PATENT DOCUMENTS

| | | | |
|---|---|---|---|
| JP | 2001-195945 | A | 7/2001 |
| JP | 2012-057137 | A | 3/2012 |
| JP | 2018-529013 | A | 10/2018 |
| WO | WO2015/128550 | A1 | 9/2015 |

\* cited by examiner

| MATERIAL | GF TENSILE STATE | GF COMPRESSIVE STATE | METHOD |
|---|---|---|---|
| LEATHER/CNT | 5.68 | 12.56 | DROP-CASTING |
| MWCNT | 13.07 | 12.87 | PRINTING |
| CNT/CB/PAPER | 7.5 | 2.6 | DIP COATING |
| CARBONIZED CELLULOSE | 10.1 | 4.45 | CREPING |
| RGO/PAPER | 7.99 | 18.96 | DIPPING |
| PEDOT:PSS NW | 35.7 | 24.1 | CAPILLARY FILLING |
| PDMS/CB | 35.2 | 45.6 | PRINTING |

*FIG. 10*

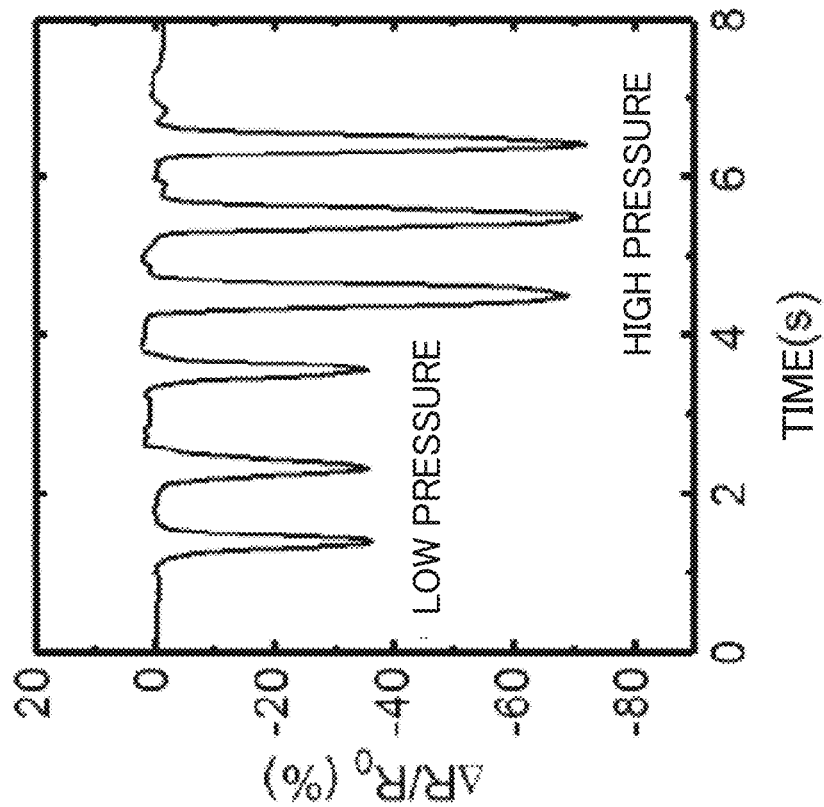
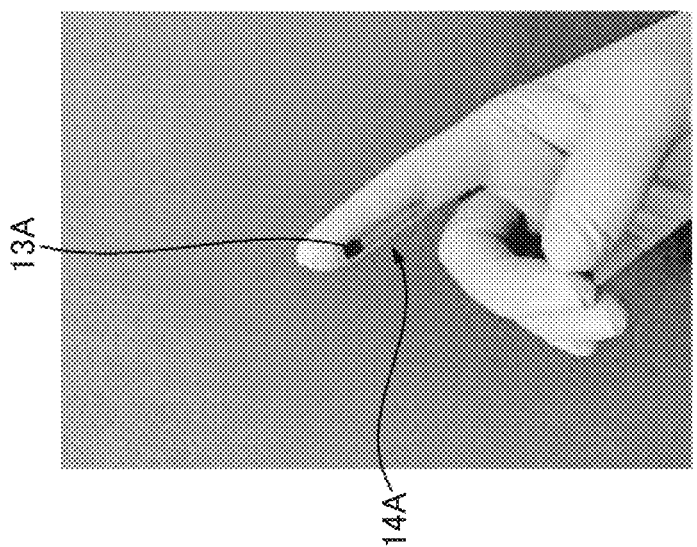
FIG. 15B
FIG. 15A

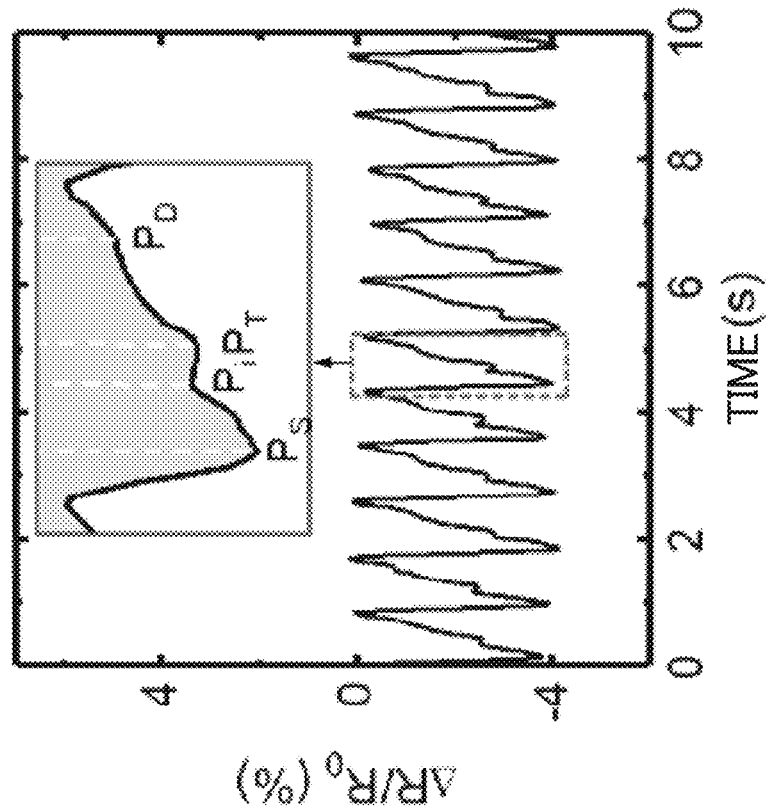
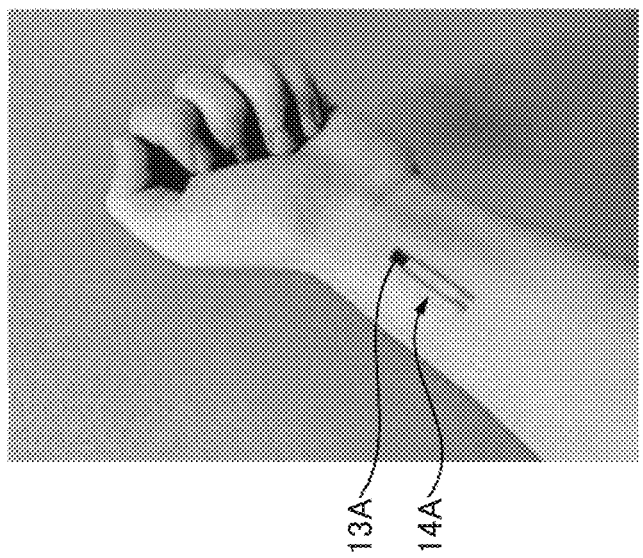
FIG. 16B
FIG. 16A

CONDUCTIVE RESIN, MANUFACTURING METHOD FOR THE SAME, AND SENSOR

CROSS-REFERENCE TO RELATED APPLICATIONS

The present application is a continuation application of PCT International Application No. PCT/JP 2021/041218 filed on Nov. 9, 2021 which claims priority from Japanese Patent Application No. 2020-197319 filed on Nov. 27, 2020, and the entire contents of each of the applications are hereby incorporated by reference.

BACKGROUND

1. Technical Field

The present invention relates to conductive resin, a manufacturing method for manufacturing the conductive resin, and a sensor including the conductive resin.

2. Related Art

In recent years, flexible and stretchable sensors have been used in various fields, for example, as a biological sensor in the healthcare field, a sensor for robotics in the robotics field, and an artificial nerve sensor for an artificial neuromorphic system. For these sensors, there is an increasing demand to use high-sensitive conductive resin.

There are known various methods for manufacturing the conductive resin. For example, Japanese Patent Laid-Open No. 2001-195945 describes that a pressure sensitive senor is manufactured by: adding spherical glassy carbon particles as conductive materials to a matrix containing liquid silicone rubber to produce a pressure-sensitive conductive composition; and applying the pressure-sensitive conductive composition to a substrate including an electrode region. The entire contents of this disclosure are hereby incorporated by reference.

SUMMARY

The present invention provides the following features.

Porous conductive resin according to the invention is produced by: mixing a hydrogen bond donor compound and a hydrogen bond acceptor compound to produce deep eutectic liquid (DEL); adding conductive materials to the DEL to produce gel; adding resin that is insoluble in the DEL to the gel to produce ink made of the gel dispersed in the resin; forming the produced ink into a formed object having a desired shape; curing the resin in the formed object; and evaporating the DEL in the formed object including the cured resin.

A manufacturing method for manufacturing conductive resin according to the invention includes: mixing a hydrogen bond donor compound and a hydrogen bond acceptor compound to produce deep eutectic liquid (DEL); adding conductive materials to the DEL to produce gel; adding resin that is insoluble in the DEL to the gel to produce ink made of the gel dispersed in the resin; forming the produced ink into a formed object having a desired shape; curing the resin in the formed object; and evaporating the DEL in the formed object including the cured resin to produce porous conductive resin.

BRIEF DESCRIPTION OF THE DRAWINGS

FIG. 10 illustrates a table for comparison of GF in the tensile state and the compressive state between the sensor by use of the conductive resin manufactured by the present manufacturing method (printing) and sensors manufactured by other printing, coating and so forth which have been reported;

FIGS. 15A and 15B illustrate the responsivity of the sensor depending on different pressing forces;

FIGS. 16A and 16B illustrate the responsivity when the sensor is used as a pulse sensor;

DETAILED DESCRIPTION

Figures 1A, 1B, 1C:
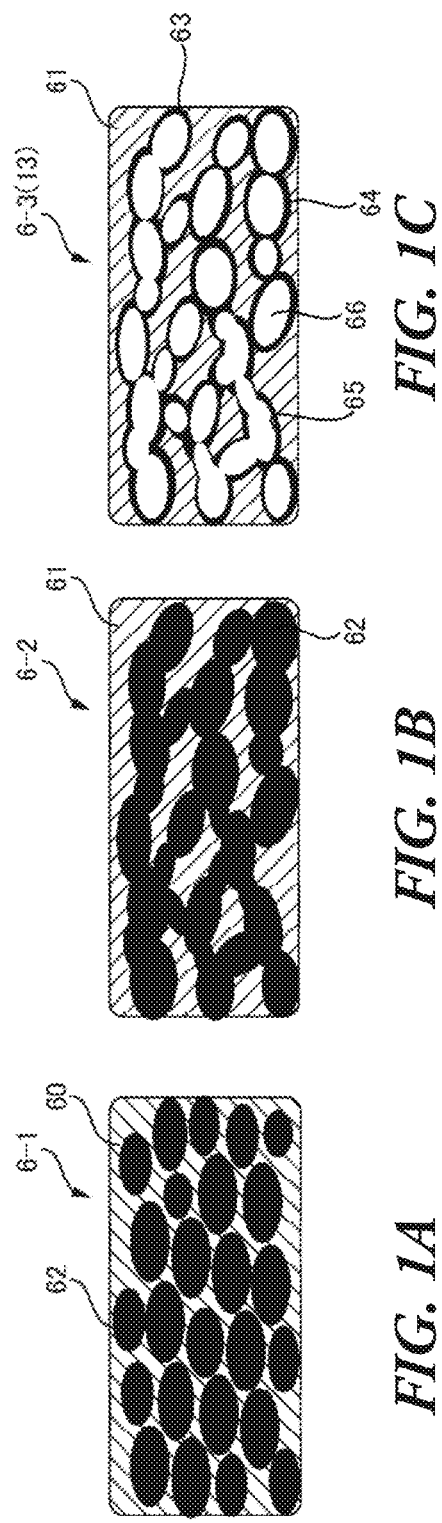
FIG. 1A is a schematic cross-sectional view illustrating a resin-DEL-conductive material ink layer printed on a substrate by using a screen printer in the thickness direction.
FIG. 1B is a schematic cross-sectional view illustrating the resin-DEL-conductive material ink layer having been subjected to pre-annealing in the thickness direction.
FIG. 1C is a schematic cross-sectional view illustrating the resin-DEL-conductive material ink layer after post-annealing in the thickness direction.

The method described in Japanese Patent Laid-Open No. 2001-195945 has a problem of increasing the manufacturing cost because a large amount of conductive materials have to be added to provide a high-sensitive sensor.

The present invention is proposed to address the problem. It is therefore an object of the invention to provide conductive resin capable of preventing an increase in the manufacturing cost, a manufacturing method for manufacturing the conductive resin, and a sensor including the conductive resin.

Hereinafter, an embodiment of the invention will be described with reference to the drawings.

<Manufacture of Conductive Resin>

With the present embodiment, by mixing a hydrogen bond donor compound and a hydrogen bond acceptor compound, deep eutectic liquid (DEL) is produced as a pore-forming material to form pores (holes) in conductive resin. Then, conductive materials are added to the DEL to produce gel (DEL-conductive material gel), and resin which is insoluble in the DEL (hereinafter, DEL-insoluble resin) is added to (mixed into) the DEL-conductive material gel to produce ink made of gel dispersed in the resin (resin-gel ink). Then, after the resin-gel ink is formed into a formed object having a desired shape by, for example, printing, the resin in the formed object is cured by, for example, pre-annealing, and then the DEL in the formed object including the cured resin is evaporated by post-annealing. By this means, porous conductive resin is manufactured.

<Hydrogen Bond Donor Compound>

A hydrogen bond donor (HBD) compound is a compound having hydrogen atoms involved in hydrogen bond. Examples of the hydrogen bond donor compound include diphenylamine, urea, thiourea, 1-methylurea, 1,3-dimethyl urea, 1,1-dimethyl urea, acetamide, benzamide, ethylene glycol, glycerol, adipic acid, benzoic acid, citric acid, malonic acid, oxalic acid, phenylacetic acid, phenylpropionic acid, succinic acid, tricarballylic acid, $MgCl_2 \cdot 6H_2O$, 2,2,2-trifluoroacetamide, and hexanediol.

<Hydrogen Bond Acceptor Compound>

A hydrogen bond acceptor (HBA) compound is a compound (salt and so forth) having an unshared electron pair (lone pair) involved in hydrogen bond. Examples of the hydrogen bond acceptor compound include benzophenone, choline chloride (ChCl), methyltriphenylphosphonium bromide, benzyltriphenylphosphonium chloride, zinc chloride ($ZnCl_2$), N-ethyl-2-hydroxy-N,N-dimethylethanaminium chloride, 2-(chlorocarbonyloxy)-N,N,N-trimethylethanaminium chloride, and N-benzyl-2-hydroxy-N,N-dimethylethanaminium.

<Production of DEL>

One or both of the hydrogen bond donor compound and the hydrogen bond acceptor compound used in the present embodiment may be in solid state at a room temperature (e.g. 25 degrees Celsius). With the present embodiment, these hydrogen bond donor compound and hydrogen bond acceptor compound are mixed at a predetermined ratio (e.g. mole ratio) to depress the melting point of the eutectic. By this means, deep eutectic liquid (DEL) which is a compound in liquid state at a room temperature (e.g. 25 degrees Celsius) is produced as a pore-forming material for conductive resin. Here, the DEL is known as, for example, a deep eutectic solvent (DES).

Here, when the hydrogen bond donor compound and the hydrogen bond acceptor compound are mixed, the mole ratio between them depends on the kinds (combination) of the hydrogen bond donor compound and the hydrogen bond acceptor compound, and therefore is not particularly limited, but may be, for example, 1:1, 2:1, 1:2.

In addition, the time for which the hydrogen bond donor compound and the hydrogen bond acceptor compound are mixed (reaction time) is not particularly limited, but may be, for example, 10 minutes to 30 minutes, and may be, for example, about 15 minutes.

For example, the diphenylamine in solid state (powder) as the hydrogen bond donor compound and the benzophenone in solid state (powder) as the hydrogen bond acceptor compound may be mixed at a mole ratio of 1:1 to produce the DES.

The DEL is not limited to this, but may be produced by mixing other hydrogen bond donor compound and hydrogen bond acceptor compound. Examples of other DEL include DEL produced by mixing choline chloride (ChCl) and urea at a mole ratio of 1:2; DEL produced by mixing choline chloride (ChCl) and thiourea at the mole ratio of 1:2; DEL produced by mixing choline chloride (ChCl) and 1-methyl urea at the mole ratio of 1:2; DEL produced by mixing choline chloride (ChCl) and 1,3-dimethyl urea at the mole ratio of 1:2; DEL produced by mixing choline chloride (ChCl) and 1,1-dimethyl urea at the mole ratio of 1:2; DEL produced by mixing choline chloride (ChCl) and acetamide at the mole ratio of 1:2; DEL produced by mixing choline chloride (ChCl) and benzamide at the mole ratio of 1:2; DEL produced by mixing choline chloride (ChCl) and ethylene glycol at the mole ratio of 1:2; DEL produced by mixing choline chloride (ChCl) and glycerol; DEL produced by mixing choline chloride (ChCl) and adipic acid at a mole ratio of 1:1; DEL produced by mixing choline chloride (ChCl) and benzoic acid at the mole ratio of 1:1 DEL produced by mixing choline chloride (ChCl) and citric acid at the mole ratio of 1:1 DEL produced by mixing choline chloride (ChCl) and malonic acid at the mole ratio of 1:1; DEL produced by mixing choline chloride (ChCl) and oxalic acid at the mole ratio of 1:1; DEL produced by mixing choline chloride (ChCl) and phenylacetic acid at the mole ratio of 1:1; DEL produced by mixing choline chloride (ChCl) and phenylpropionic acid at the mole ratio of 1:1; DEL produced by mixing choline chloride (ChCl) and succinic acid at the mole ratio of 1:1; DEL produced by mixing choline chloride (ChCl) and tricarballylic acid at the mole ratio of 1:1; DEL produced by mixing choline chloride (ChCl) and $MgCl_2 \cdot 6H_2O$ at the mole ratio of 1:1; DEL produced by mixing methyltriphenylphosphonium bromide and glycerol; DEL produced by mixing methyltriphenylphosphonium bromide and ethylene glycol; DEL produced by mixing methyltriphenylphosphonium bromide and 2,2,2-trifluoroacetamide; DEL produced by mixing benzyltriphenylphosphonium chloride and glycerol; DEL produced by mixing benzyltriphenylphosphonium chloride and ethylene glycol; DEL produced by mixing benzyltriphenylphosphonium chloride and 2,2,2-trifluoroacetamide; DEL produced by mixing zinc chloride ($ZnCl_2$) and urea; DEL produced by mixing zinc chloride ($ZnCl_2$) and acetamide; DEL produced by mixing zinc chloride ($ZnCl_2$) and ethylene glycol; and DEL produced by mixing zinc chloride ($ZnCl_2$) and hexanediol. Here, the mole ratios between the above-described hydrogen bond donor compound and hydrogen bond acceptor compound are not limited.

It is preferred that the DEL according to the present embodiment has a boiling point higher than that of the resin (DEL-insoluble resin) added to the DEL and has a boiling point equal to or lower than the heatproof temperature of the resin. Here, with the present embodiment, the heatproof temperature of the resin means not only a temperature at which the shape of the cured resin is maintained without any damage such as degradation and embrittlement, but also a temperature at which part of the cured resin remains even though the resin is somewhat deformed because of being softened. For example, when the resin is PDMS, it is preferred that the DEL has a boiling point of 60 to 150 degrees Celsius, particularly, 80 to 150 degrees Celsius.

<Production of Gel>

With the present embodiment, conductive materials are added to the DEL and stirred to produce gel made by mixing the conductive materials into the DEL (DEL-conductive material gel).

The conductive materials are not particularly limited, but, for example, carbon materials such as carbon black (CB), graphite (GF), carbon nanotube (CNT), carbon nanofiber (CNF), carbon nanowire (CNW), carbon fiber, and black lead are preferably used, and two or more kinds of them may be contained.

Alternatively, the conductive materials may be metallic particles of, for example, gold, silver, copper, chromium, titanium, platinum, nickel, tin, zinc, lead, tungsten, iron, and aluminum; particles of a compound containing these kinds of metal; particles of conductive resin, composite particles obtained by coating resin particles with conductive metal such as electroless nickel; or may be metal nanowire (MNW) and metal fiber.

When the conductive materials are the carbon materials, the color of the gel made by mixing the carbon materials into the DEL (DEL-carbon material gel) is opaque black.

<DEL-Insoluble Resin>

With the present embodiment, the resin added to (mixed into) the DEL is not particularly limited as long as it is DEL-insoluble resin, but examples of the resin include silicone resin, biodegradable plastic of aromatic polyester (for example, product name: Ecoflex (registered trademark) produced by BASF), ABS resin, polyethylene (PE), and polyvinylidene fluoride (PVDF).

Examples of the silicone resin include plydimethylsiloxane (PDMS), polyphenylmethylsiloxane (PMPS), and polydiphenylsiloxane (PDPS).

Among them, the plydimethylsiloxane (PDMS) may be preferably used. The PDMS is produced by crosslinking reaction between siloxane oligomer (base) and a siloxane crosslinking agent (curing agent). For this crosslinking reaction, for example, hexachloroplatinic acid ($H_2PtCl_6$) as a catalyst may be added to a reaction mixture and the reaction mixture is mixed at 80 degrees Celsius for one hour.

Here, the DEL-insoluble resin may be cured by whatever means, and may be, for example, thermosetting resin cured by heat, ultraviolet (UV) cured resin cured by irradiation of ultraviolet light, and electron beam cured resin cured by irradiation of electron beams.

<Production of Ink>

With the present embodiment, the DEL-insoluble resin is added to the gel made by adding conductive materials to the DEL (DEL-conductive material gel). Phase separation (self-separation) of the DEL from the resin occurs, and therefore the DEL-conductive material gel (gel drops) is present and dispersed in the resin. In this way, ink made of the DEL-conductive material gel (gel drops) dispersed in the resin (resin-DEL-conductive material ink) is produced. For example, PDMS as resin may be added to the DEL-conductive material gel to produce PDMS-DEL-conductive material ink made of DEL-conductive material gel dispersed in the PDMS. The PDMS-DEL-conductive material ink is composite ink in opaque black.

<Printing of Ink>

With the present embodiment, the resin-DEL-conductive material ink is printed on (applied to) a substrate by using a squeegee by a printing method such as screen printing. By this means, a layer of the resin-DEL-conductive material ink is formed. An example of the substrate includes PEN (polyethylene naphthalate). However, this is by no means limiting, but examples of the material of the substrate include PDMS (polydimethylsiloxane), PI (polyimide), PET (polyethylene terephthalate), PC (polycarbonate), PU (polyurethane), paper, and cloth.

FIG. 1A is a schematic cross-sectional view illustrating a resin-DEL-conductive material ink layer 6-1 printed on a substrate by using a screen printer in the thickness direction. As illustrated in FIG. 1A, phase separation (self-separation) of the DEL (for example, obtained by the reaction of mixing diphenylamine and benzophenone) from DEL-insoluble resin 60 (e.g. PDMS) occurs in the resin-DEL-conductive material ink layer 6-1, and therefore gel drops 62 of DEL-conductive material gel are present and dispersed in the resin 60.

Here, the forming method of the ink layer is not limited to the printing by using the screen printer, but the ink layer may be formed by other forming methods. Examples of forming methods include bar coating, spin coating, and dip coating, or other coating methods and injection molding may be possible. As the forming method for the ink layer, the printing method by using the printer is employed as an excellent technique for mass productivity, enlargement of the area, and patterning.

<Pre-Annealing>

With the present embodiment, the resin-DEL-conductive material ink layer 6-1 on the substrate is subjected to pre-annealing (a first step of annealing). It is preferred that the temperature of the pre-annealing (heating) is a temperature at which the DEL-insoluble resin (thermosetting resin in this case) is cured but the DEL is not evaporated. For example, when the DEL obtained by the reaction of mixing diphenylamine and benzophenone is used, and PDMS is used as the DEL-insoluble resin, it is preferred that the temperature of the pre-annealing is 60 to 90 degrees Celsius at which the PDMS starts curing. In addition, it is preferred that the time for the pre-annealing is 30 to 120 minutes. When the PDMS is used, for example, the temperature of the pre-annealing may be 75 degrees Celsius, and the time for the pre-annealing may be 60 minutes.

FIG. 1B is a schematic cross-sectional view illustrating a resin-DEL-conductive material ink layer 6-2 having been subjected to the pre-annealing in the thickness direction. The resin-DEL-conductive material ink layer 6-2 having been subjected to the pre-annealing is in a state where the DEL-insoluble resin 60 is cured by the pre-annealing (cured resin 61). The resin-DEL-conductive material ink layer 6-2 having been subjected to the pre-annealing has a connected structure in which the gel drops 62 of the DEL-conductive material gel are connected to each other in the cured resin 61.

Here, when the DEL-insoluble resin is not thermosetting resin, but is, for example, UV cured resin, the UV cured resin may be cured by irradiation of ultraviolet light, instead of the pre-annealing. In the same way, when the DEL-insoluble resin is, for example, electron beam cured resin, the electron beam cured resin may be cured by irradiation of electron beams, instead of the pre-annealing.

<Post-Annealing>

With the present embodiment, the resin-DEL-conductive material ink layer 6-2 cured by having been subjected to the pre-annealing is subjected to post-annealing (a second step of annealing). The temperature of the post-annealing (heating) is not particularly limited, but, when the DEL obtained by the reaction of mixing diphenylamine and benzophenone is used, and PDMS is used as the DEL-insoluble resin, it is preferred that the temperature is 120 to 150 degrees Celsius. In addition, the time for the post-annealing is not particularly limited, but when the DEL obtained by the reaction of mixing diphenylamine and benzophenone is used, and PDMS is used as the DEL-insoluble resin, it is preferred that the time is 30 to 120 minutes. When the PDMS is used, for example, the temperature may be 140 degrees Celsius and the time may be 30 minutes for the post-annealing.

FIG. 1C is a schematic cross-sectional view illustrating a resin-DEL-conductive material ink layer 6-3 (i.e. a conductive resin layer 13) having been subjected to the post-annealing in the thickness direction. By the post-annealing, most of the DEL in the resin-DEL-conductive material ink layer 6-3 is evaporated and removed. Then, a porous structure 63 having a lot of pores 64 each corresponding to the shape of a gel drop 62 of the DEL-conductive material gel is formed. The conductive resin layer 13 includes connected holes formed by connecting pores 64 to each other, which are formed by connecting the gel drops 62 to each other. In the conductive resin layer 13, a lot of conductive materials 65 are close together along the inner walls of the pores 64. Then, as illustrated in FIG. 1C, the conductive material layer 13 includes voids 66 surrounded by the conductive materials 65 being close together. The lot of conductive materials 65 are close together along the inner walls of the connected pores 64 (connected holes), thereby to form an efficient conductive path. By the present manufacturing method described above, the porous conductive resin layer 13 having the efficient conductive path is manufactured.

The residual ratio (%) of the DEL in the resin-DEL-conductive material ink layer 6-3 (i.e. conductive resin layer 13) having been subjected to the post-annealing is defined as residual ratio (N)=(content (ml) of the DEL in "resin-DEL-conductive material ink layer 6-2" before the post-annealing−content (ml) of the DEL evaporated by the post-annealing)/content (ml) of the DEL in "resin-DEL-conductive material ink layer 6-2" before the post-annealing×100(%).

It is preferred that the residual ratio N is equal to or lower than 5%. The residual ratio N of the DEL is equal to or lower than 5%, and therefore it is possible to produce high-quality porous conductive resin, specifically, porous conductive resin having safety sufficiently ensured, and minimizing outgassing due to the DEL not to have an adverse effect on others.

In the conductive resin manufactured by the manufacturing method according to the present embodiment, the thickness of its conductive resin layer is not particularly limited, but may be, for example, 20 µm to 2 mm, and may be about 100 µm as a specific example. In addition, the size of each pore (pore size) is not particularly limited, but it is preferred that, for example, the longer diameter of a pore is 1 µm to 500 µm, and more preferably 5 µm to 500 µm. In addition, the size (particle diameter) of a conductive material added in the present manufacturing method may be, for example, 20 nm to 20 µm.

Moreover, for the conductive resin manufactured by the manufacturing method according to the present embodiment, provided that the total volume (apparent volume) of the conductive resin is V ($\mu m^3$), and the volume of the voids is v ($\mu m^3$), percentage of voids P is defined as P=v/V×100 (%). It is preferred that the percentage of voids P of the conductive resin is 10% to 90%, and more preferably 30% to 60%.

Moreover, for the conductive resin manufactured by the manufacturing method according to the present embodiment, provided that the length of the conductive resin before being stretched is $M_0$, and the length of the conductive resin after being stretched is M (in the stretch direction), stretching rate U of the stretched conductive resin is defined as U=(M-$M_0$)/$M_0$×100(%). The stretching rate U of the conductive resin may be, for example, 0 to 200%. In this way, the conductive resin may have stretchability of a stretching rate of 200% to smoothly recover to have the original length.

The manufacturing method according to the present embodiment can produce ink by simple operation, for example, by mixing materials, and manufacture the porous conductive resin simply by printing the ink and performing two-step annealing. This simple method can prevent an increase in the manufacturing cost for manufacturing the conductive resin and manufacturing a sensor by using the conductive resin as a material.

Moreover, the ink made of gel dispersed in the DEL-insoluble resin (resin-DEL-conductive material ink) can be printed, and therefore it is possible to enlarge the area of the conductive resin by using a printing method such as screen printing, and further, it is possible to easily form any patterns.

<Sensor>

The porous conductive resin manufactured according to the present embodiment has a sponge-like structure. This conductive resin is highly sensitive, and also has excellent flexibility and stretchability. Therefore, this conductive resin may be used as a component of, for example, a biological sensor in the healthcare field, a sensor for robotics in the robotics field, and an artificial nerve sensor for an artificial neuromorphic system.

The sensor may be manufactured as follows as an example. By using a screen printer, a film mask having holes in a pattern for electrodes is placed on a substrate made of PDMS, and coated with silver (Ag) paste thereon with a squeegee. Then, the Ag paste is baked to form Ag electrode members corresponding to the pattern. After that, also by using the screen printer, a film mask having holes in a pattern for conductive resin is placed on the Ag electrode members, and painted with resin-DEL-conductive material ink thereon with a squeegee. By this means, a resin-DELconductive material ink layer having the hole pattern is formed. Then, the resin-DEL-conductive material ink is subjected to two-step annealing (pre-annealing and post-annealing). By this means, a sensor including the Ag electrode members and the conductive resin on the substrate is manufactured.

Here, to manufacture the sensor, other forming methods such as bar coating, spin coating, and dip coating, or other coating methods, and injection molding may be adopted, instead of the printing with the screen printer as described above. In addition, to manufacture the sensor, when the resin (DEL-insoluble resin) is, for example, UV cured resin, the UV cured resin may be cured by irradiation of ultraviolet light, instead of the pre-annealing, as described above. Moreover, to manufacture the sensor, when the resin (DEL-insoluble resin) is, for example, electron beam cured resin, the electron beam cured resin may be cured by irradiation of electron beams, instead of the pre-annealing, as described above.

<Comparison with Conventional Conductive Resin>

Figure 2A:
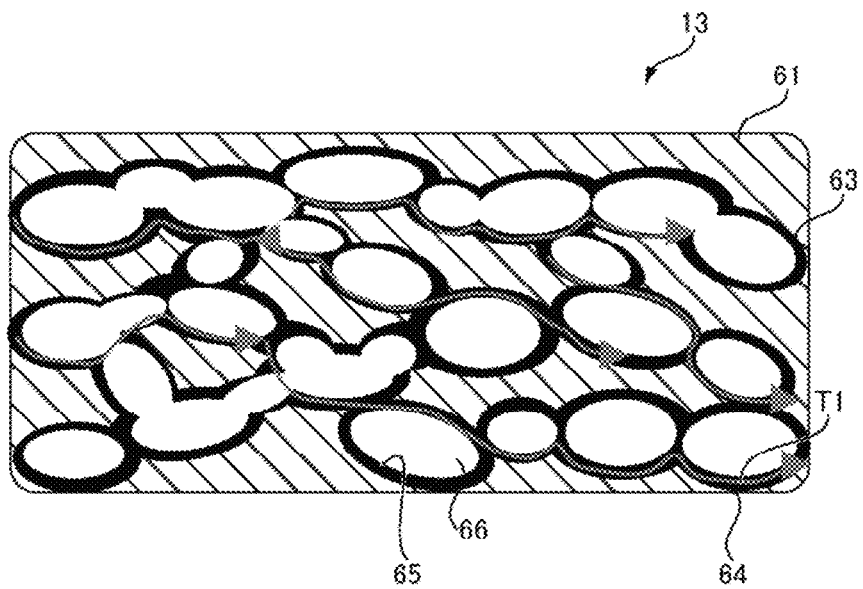
FIG. 2A is a schematic cross-sectional view illustrating a conductive resin layer manufactured by a manufacturing method according to an embodiment in the thickness direction.
Figure 2B:
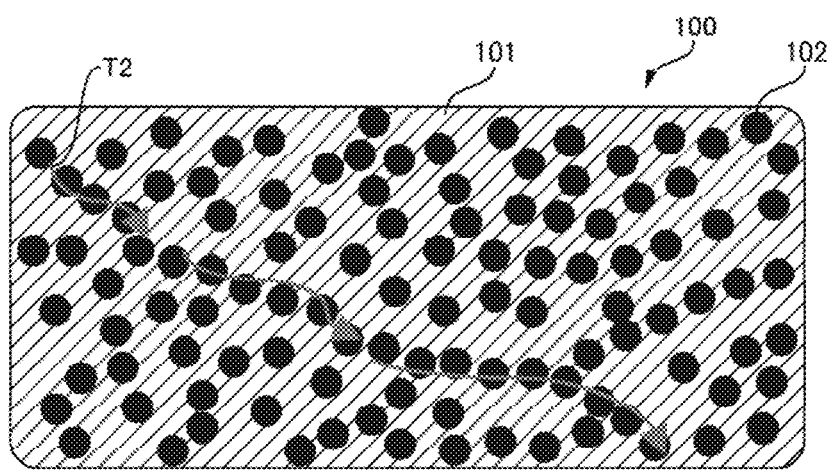
FIG. 2B is a schematic cross-sectional view illustrating a conductive resin layer manufactured by one conventional manufacturing method in the thickness direction.

FIG. 2A is a schematic cross-sectional view illustrating the conductive resin layer 13 manufactured by the manufacturing method according to the present embodiment in the thickness direction. FIG. 2B is a schematic cross-sectional view illustrating a conductive resin layer 100 manufactured by one conventional manufacturing method in the thickness direction. With this conventional manufacturing method, the DEL is not used, and conductive materials (e.g. carbon black (CB) and graphite (GF)) is directly mixed into the resin (e.g. polydimethylsiloxane (PDMS)) and heated to manufacture conductive resin.

Compared to this conductive resin manufactured by the conventional manufacturing method, the conductive resin manufactured by the manufacturing method according to the present embodiment provides various advantages.

As illustrated in FIG. 2A, the conductive resin layer 13 manufactured by the manufacturing method according to the present embodiment includes the voids 66, and has the porous structure 63 of the lot of pores 64 in the DEL-insoluble resin 61. This conductive resin layer 13 includes connected holes formed by connecting pores 64 to each other. Then, the lot of conductive materials 65 are close together along the inner walls of the pores 64 to form a conductive path indicated by arrows T1 of FIG. 2A.

That is, with the manufacturing method according to the present embodiment, phase separation (self-separation) of the DEL from the resin occurs, and liquid particles of the separated DEL are evaporated and removed, so that pores are formed. As a result, the conductive path is formed along the inner walls of these pores (the self-separating conductive path along the porous structure is formed). Generally, it is difficult to achieve this self-separating conductive path by using conductive materials, and complicated processes are needed. However, with the present embodiment, it is possible to easily form this self-separating conductive path.

On the other hand, for example, as illustrated in FIG. 2B, the conductive resin layer 100 manufactured by the conventional manufacturing method has no void, and conductive materials 102 are randomly located in resin 101, and therefore points at which the conductive materials 102 contact each other form a conductive path indicated by arrows T2. That is, the conductive path formed in the conductive resin layer 100 manufactured by the conventional manufacturing method is limited and inefficient. Moreover, with the conductive resin layer 13 according to the present embodiment, it is possible to make a percolation threshold lower than that of the conductive resin layer 100 manufactured by the conventional manufacturing method.

Accordingly, for a sensor manufactured by using the conductive resin manufactured by the conventional manufacturing method, in order to achieve the sensitivity equivalent to that of the sensor manufactured by using the conductive resin according to the present embodiment, a large amount of conductive materials must be contained in the conductive resin. That is, with the conductive resin according to the present embodiment, it is possible to make the sensor highly sensitive by using a smaller amount of conductive materials than the sensor by use of the conductive resin manufactured by the conventional manufacturing method, and therefore can prevent an increase in the manufacturing cost. In addition, with the present embodiment, it is possible to more easily manufacture this high-sensitive sensor than the conventional manufacturing method.

Moreover, the sensor manufactured by using the conductive resin according to the present embodiment has excellent sensing capabilities (e.g. high sensitivity, a capability of sensing anisotropic bending, and a pressure sensing capability).

By this means, the sensor manufactured by using the conductive resin according to the present embodiment can be widely used as sensors to sense, for example, motions of a person, and motions of a robot (motions of a robot gripper, and gripping motions of a robot).

Moreover, the ink made of gel dispersed in the DEL-insoluble resin (resin-DEL-conductive material ink) can be printed, and therefore it is possible to easily manufacture the conductive resin layer in any size (e.g. a large area) and in any pattern by using a printing technique such as screen printing.

EXAMPLES

Hereinafter, the present invention will be described in detail using examples. However, the present invention is not limited to the examples.

(1) Manufacture of Conductive Resin

Figure 3:
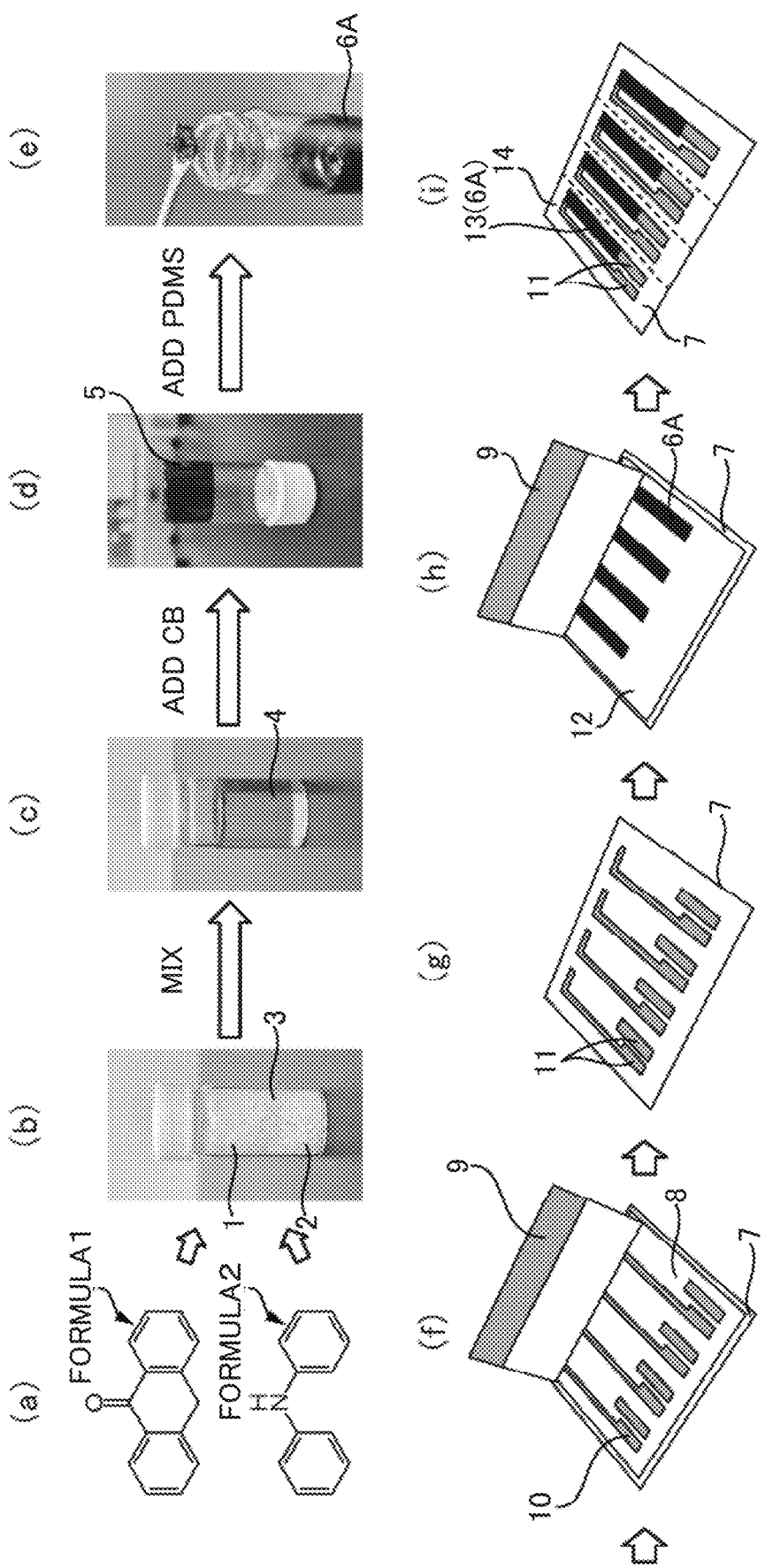
FIG. 3 illustrates an example of manufacture of conductive resin.

FIG. 3 illustrates an example of manufacture of conductive resin. With the example of manufacture (hereinafter referred to as "present manufacturing method"), benzophenone in solid state (powder) at a room temperature (about 25 degrees Celsius) (produced by Tokyo Chemical Industry Co., Ltd) (formula 1 of FIG. 3(a)) was prepared in advance as a hydrogen bond acceptor compound. In addition, diphenylamine in solid state (powder) at a room temperature (about 25 degrees Celsius) (produced by Tokyo Chemical Industry Co., Ltd) (formula 2 of FIG. 3(a)) was prepared in advance as a hydrogen bond donor compound.

Then, as illustrated in FIG. 3(b), the benzophenone (powder 1) and the diphenylamine (powder 2) were put in a transparent container and tightly sealed by closing a lid at the room temperature (about 25 degrees Celsius). The reaction between the benzophenone (powder 1) and the diphenylamine (powder 2) progressed at their contract portion 3 in the container.

These benzophenone (powder 1) and diphenylamine (powder 2) were stirred and mixed. Here, the benzophenone (powder 1) and the diphenylamine (powder 2) were mixed at a mole ratio of 1:1. By this means, deep eutectic liquid (DEL) (liquid 4) as illustrated in FIG. 3(c) was produced. This DEL (liquid 4) was liquid in transparent yellow.

Then, conductive materials (carbon black (CB) particles) were added to the DEL (liquid 4) and stirred. By this means, gel made by mixing the conductive materials into the DEL (DEL-CB gel) (gel 5) was produced as illustrated in FIG. 3(d). This DEL-CB gel (gel 5) was gelatinous substance in opaque black. Here, the particle size of the conductive materials (CB particles) used was about 34 nm.

After that, polydimethylsiloxane (PDMS) as DEL-insoluble resin was added to the DEL-CB gel (gel 5) and stirred. By this means, PDMS-DEL-CB ink (ink 6A) made of DEL-CB gel particles dispersed in the PDMS in opaque black as illustrated in FIG. 3(e) was produced.

Next, by using a screen printer, a film mask 8 having holes in a pattern for electrode members was placed on a substrate (PEN) 7, and coated (i.e. printed) with silver (Ag) paste 10 thereon with a squeegee 9 as illustrated in FIG. 3(f). Then, as illustrated in FIG. 3(g), the Ag paste 10 was baked to form Ag electrode members 11 corresponding to the pattern.

After that, also by using the screen printer, a film mask 12 having holes in a pattern for conductive resin was placed on the Ag electrode members 11 formed on the substrate 7, and painted (printed) with the PDMS-DEL-CB ink (the ink 6A) thereon with the squeegee 9 as illustrated in FIG. 3(h). By this means, a layer of the PDMS-DEL-CB ink (the ink 6A) corresponding to the hole pattern was formed so as to connect the Ag electrode materials 11 to each other.

Then, as illustrated in FIG. 3(i), the layer of the PDMS-DEL-CB ink (the ink 6A) formed to connect the Ag electrode members 11 to each other was subjected to two-step annealing (pre-annealing and post-annealing). By this means, sensors 14 including the Ag electrode members 11 and the porous conductive resin layer 13 on the substrate 7 was manufactured. Here, with the present manufacturing method, four sensors 14 were manufactured by cutting the substrate 7 along dotted lines as illustrated in FIG. 3(i).

Here, the two-step annealing (pre-annealing and post-annealing) will be described. The PDMS-DEL-CB ink (the ink 6A) printed on the substrate 7 by using the screen printer was subjected to pre-annealing at 75 degrees Celsius for one hour. The PDMS in the PDMS-DEL-CB ink (the ink 6A) layer having been subjected to the pre-annealing was cured by the pre-annealing.

The PDMS-DEL-CB ink (the ink 6A) having been subjected to the pre-annealing was subjected to post-annealing at 140 degrees Celsius for 30 minutes. By this post-annealing, the DEL in the cured resin-DEL-CB ink (the ink 6A) was evaporated and removed. By this means, the porous conductive resin layer 13 was manufactured.

In addition, with the present manufacturing method, graphite (GF) flakes were used as conductive materials instead of the carbon black (CB) particles to manufacture porous conductive resin in the same way. The longer diameter of a conductive material (a GF flake) used here was about 10 μm.

(2) Structure of Conductive Resin Layer

FIGS. 4A-4I are pictures of conductive resin layers manufactured by the present manufacturing method and conductive resin layers manufactured by the conventional manufacturing method, taken by an optical microscope (OM) and a scanning electron microscope (SEM).

Figure 4C:
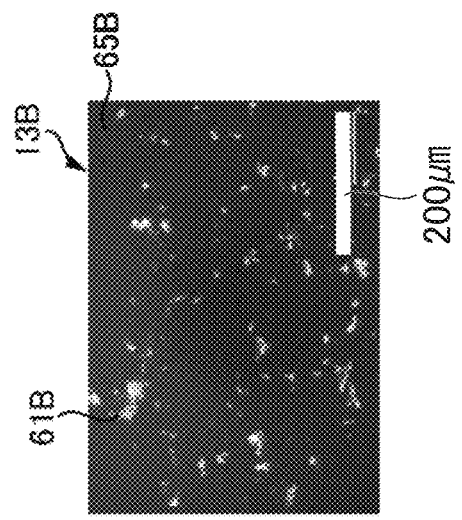
FIG. 4C is an OM picture illustrating the upper surface of a conductive resin layer (PDMS/GF) 13B manufactured by the present manufacturing method, where graphite (GF) flakes are used as conductive materials.
Figure 4B:
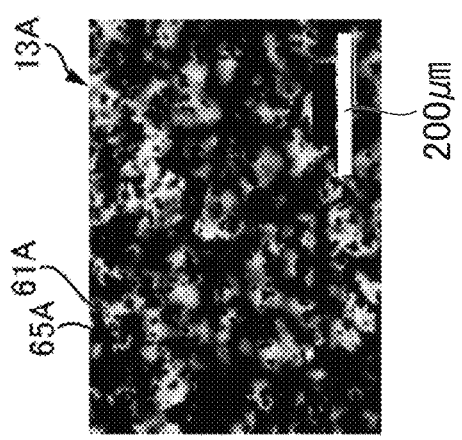
FIGS. 4A and 4B are optical microscopy (OM) pictures illustrating the upper surface of a conductive resin layer (PDMS/CB) 13A manufactured by the present manufacturing method, where carbon black (CB) particles are used as conductive materials.
Figure 4A:
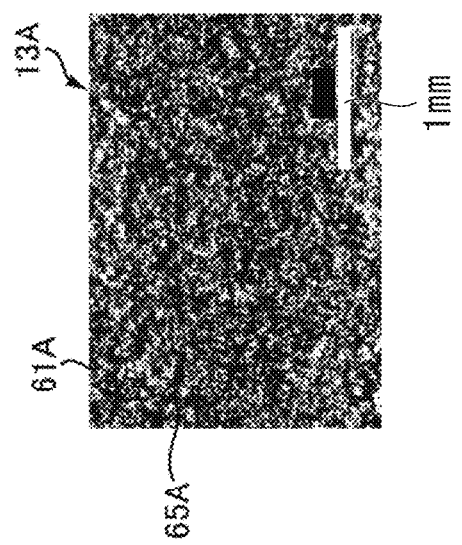

FIGS. 4A and 4B are OM pictures of the top surface of a conductive resin layer (PDMS/CB) 13A manufactured by the present manufacturing method by using carbon black (CB) particles as conductive materials. FIG. 4C is an OM picture of the top surface of a conductive resin layer (PDMS/GF) 13B manufactured by the present manufacturing method by using graphite (GF) flakes as conductive materials.

As illustrated in FIGS. 4A and 4B, it is clearly recognized from these OM pictures that regions (dark portions) in which the conductive materials (CB particles) 65A agglutinate, and matrix portions (light portions) of resin (PDMS) 61A appear in the upper surface of the conductive resin layer (PDMS/CB) 13A manufactured by the present manufacturing method, and therefore phase separation between them occurs. In addition, as illustrated in FIG. 4C, it is clearly recognized that regions (dark portions) in which conductive materials (GF) 65B agglutinate, and matrix portions (light portions) of resin (PDMS) 61B appear in the upper surface of the conductive resin layer (PDMS/GF) 13B manufactured by the present manufacturing method, and therefore phase separation between them occurs.

Figure 4F:
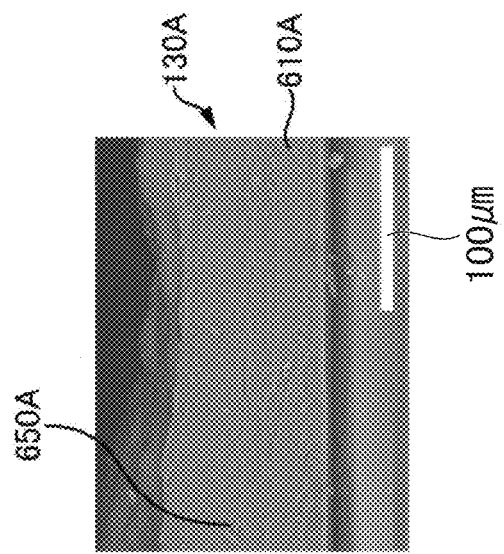
FIG. 4F is a SEM picture illustrating a conductive resin layer (PDMS/CB) 130A manufactured by the conventional manufacturing method in the thickness direction, where carbon black (CB) particles are used as conductive materials.
Figure 4E:
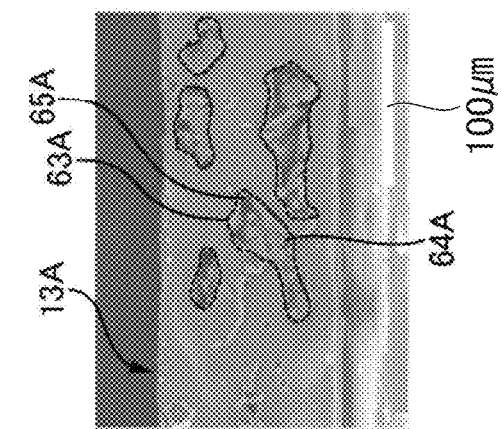
FIGS. 4D and 4E are scanning electron microscope (SEM) pictures illustrating the conductive resin layer (PDMS/CB) 13A manufactured by the present manufacturing method in the thickness direction, where carbon black (CB) particles are used as conductive materials.
Figure 4D:
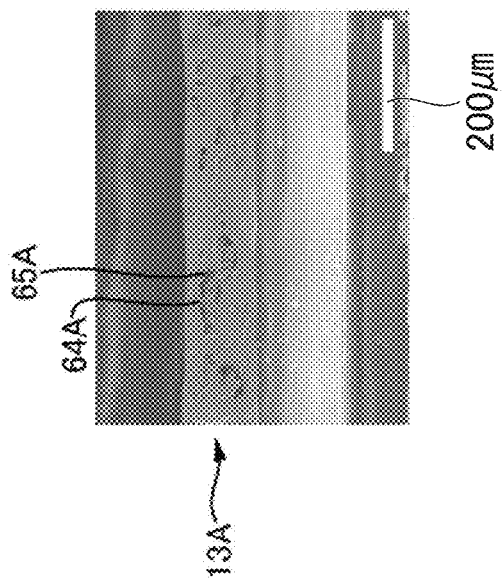

FIGS. 4D and 4E are SEM pictures of a cross section of the conductive resin layer (PDMS/CB) 13A manufactured by the present manufacturing method by using CB particles as conductive materials in the thickness direction. Meanwhile, FIG. 4F is a SEM picture of a cross section of the conductive resin layer (PDMS/CB) 130A manufactured by the conventional manufacturing method by using CB particles as conductive materials in the thickness direction. With the conventional manufacturing method using the CB particles as conductive materials, the DEL was not used, and the CB particles as the conductive materials were directly mixed into the PDMS and heated to manufacture the conductive resin.

As illustrated in FIGS. 4D and 4E, the conductive resin layer (PDMS/CB) 13A manufactured by the present manufacturing method using the CB particles as conductive materials has a porous structure 63A, and a lot of conductive materials (CB) 65A are close together along the inner walls of pores 64A to form a conductive path resulting from a connected structure of the conductive materials (CB) 65A connecting to each other.

On the other hand, as illustrated in FIG. 4F, in the conductive resin layer (PDMS/CB) 130A manufactured by the conventional manufacturing method using CB particles as conductive materials, it is recognized that voids due to the phase separation (self-separation) structure as seen in FIG. 4E do not appear, and conductive materials (CB particles) 650A are present and dispersed randomly in resin (PDMS) 610A.

Figure 4I:
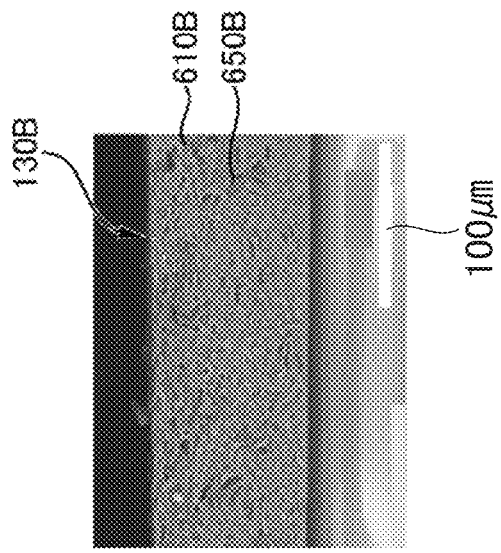
FIG. 4I is SEM picture illustrating a conductive resin layer (PDMS/GF) 130B manufactured by the conventional manufacturing method in the thickness direction, where GF flakes are used as conductive materials.
Figure 4H:
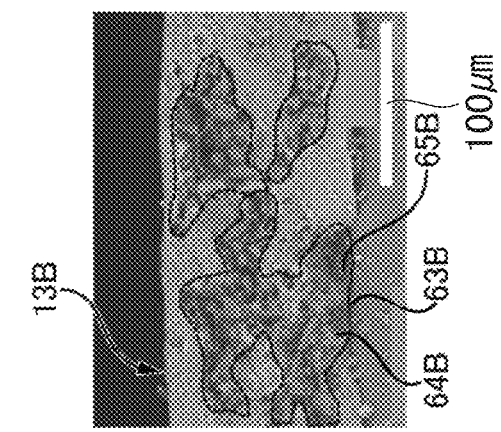
FIGS. 4G and 4H are SEM pictures illustrating the conductive resin layer (PDMS/GF) 13B manufactured by the present manufacturing method in the thickness direction, where GF flakes are used as conductive materials.
Figure 4G:
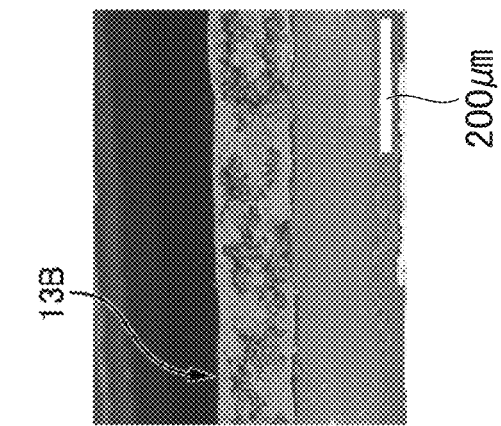

FIG. 4G and FIG. 4H are SEM pictures of a cross section of the conductive resin layer (PDMS/GF) 13B manufactured by the present manufacturing method using GF flakes as conductive materials in the thickness direction. Meanwhile, FIG. 4I is a SEM picture of a cross section of the conductive resin layer (PDMS/GF) 130B manufactured by the conventional manufacturing method using GF flakes as conductive materials in the thickness direction. With the conventional manufacturing method using GF flakes as conductive materials, the DEL was not used, and the GF flakes as conductive materials were directly mixed into the PDMS and heated to manufacture conductive resin.

As illustrated in FIGS. 4G, and 4H, the conductive resin layer (PDMS/GF) 13B manufactured by the present manufacturing method using GF flakes as conductive materials has a porous structure 63B, and a lot of conductive materials (GF flakes) 65B are present along the inner walls of pores 64B to form a conductive path resulting from a connected structure of the conductive materials (GF flakes) 65B connecting to each other.

On the other hand, as illustrated in FIG. 4I, in the conductive resin layer (PDMS/GF) 130B manufactured by the conventional manufacturing method using GF flakes as conductive materials, it is recognized that voids due to the phase separation (self-separation) structure as seen in FIG.

4H do not appear, and conductive materials (GF flakes) 650B are present and dispersed randomly in resin (PDMS) 610B.

Moreover, from FIGS. 4D, 4E, 4G, and 4H, it is recognized that in the conductive resin layers 13A and 13B, the above-described percentage of voids P is 10% to 90%, and more specifically 30% to 60%.

(3) Conductivity with Respect to Concentration of Conductive Materials

Figure 5A:
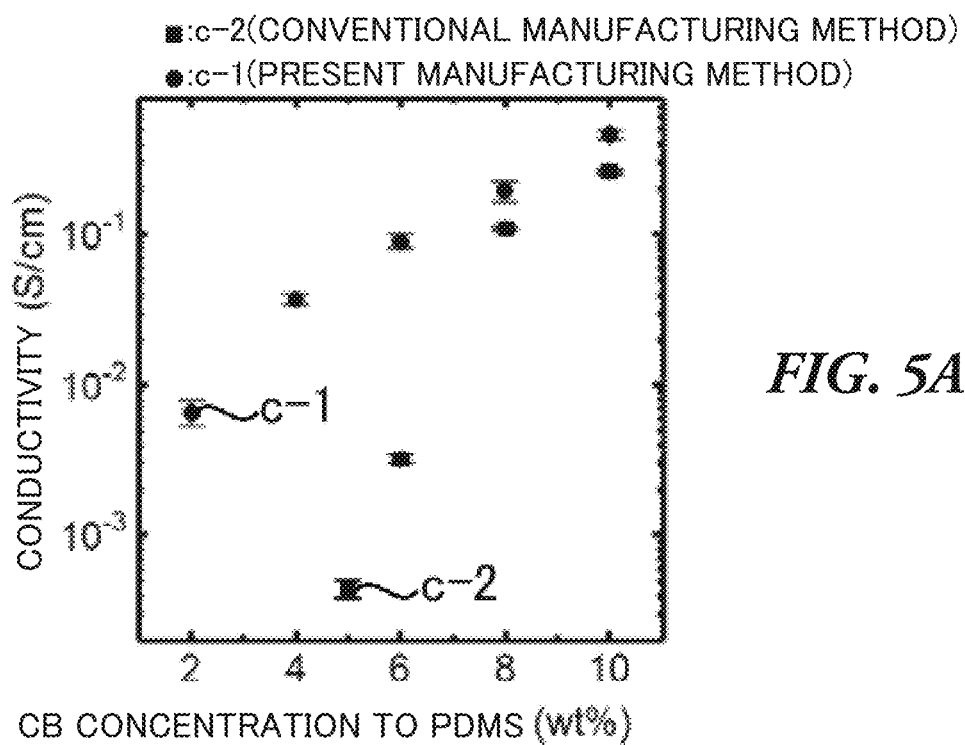
FIGS. 5A and 5B illustrate the conductivity with respect to the concentration of the conductive materials.

With the present manufacturing method, conductive resin having voids and including a lot of CB particles along the inner walls of pores was manufactured by mixing DEL, carbon black (CB) particles, and PDMS. The mole ratio of the mixed PDMS and DEL was 2 to 1 (PDMS:DEL=2:1). In a sensor by use of this conductive resin, the concentration (wt %) of the carbon black (CB) to the PDMS was changed, and the conductivity (S/cm) of the conductive resin was measured in each case. The result of the measurement is illustrated in FIG. 5A as plot c-1 indicated by black circles (the present manufacturing method). Here, for the measurements of the conductivity illustrated in both of FIGS. 5A and 5B, a measuring device (Keithley Model DMM6500) was used.

Meanwhile, with the conventional manufacturing method, conductive resin having no void and made of carbon black (CB) particles dispersed in PDMS was manufactured. In a sensor by use of this conductive resin, the concentration (wt %) of the carbon black (CB) to the PDMS in the conductive resin was changed, and the conductivity (S/cm) of the conductive resin was measured in each case. The result of the measurement is illustrated in FIG. 5A as plot c-2 indicated by black squares (the conventional manufacturing method).

As illustrated in FIG. 5A, for each of the sensor by use of the conductive resin manufactured by the present manufacturing method using CB particles as conductive materials (the plot c-1), and the sensor by use of the conductive resin manufactured by the conventional manufacturing method using CB particles as conductive materials (the plot c-2), the conductivity (S/cm) of the conductive resin was raised as the CB concentration (wt %) to the PDMS was increased.

However, as illustrated in FIG. 5A, the sensor by use of the conductive resin manufactured by the present manufacturing method using CB particles as conductive materials (the plot c-1) exhibited a higher conductivity (S/cm) of the conductive resin than that of the sensor by use of the conductive resin manufactured by the conventional manufacturing method using CB particles as conductive materials (the plot c-2) at the same CB concentration (wt %).

In addition, with the present manufacturing method, conductive resin having voids and including graphite (GF) flakes along the inner walls of pores was manufactured by mixing DEL, GF flakes, and PDMS. The mole ratio of the mixed PDMS and DEL was 2 to 1 (PDMS:DEL=2:1). In a sensor by use of this conductive resin, the concentration (wt %) of the graphite (GF) to the PDMS in the conductive resin was changed, and the conductivity (S/cm) of the conductive resin was measured for each of the GF concentrations (wt %). The result of the measurement is illustrated in FIG. 5B as plot c-3 indicated by white circles (the present manufacturing method).

Meanwhile, with the conventional manufacturing method, conductive resin having no void and made of graphite (GF) flakes dispersed in PDMS was manufactured. In a sensor by use of this conductive resin, the concentration (wt %) of the graphite (GF) to the PDMS in the conductive resin was changed, and the conductivity (S/cm) of the conductive resin was measured for each of the GF concentrations (wt %). The result of the measurement is illustrated in FIG. 5B as plot c-4 indicated by white squares (the conventional manufacturing method).

Figure 5B:
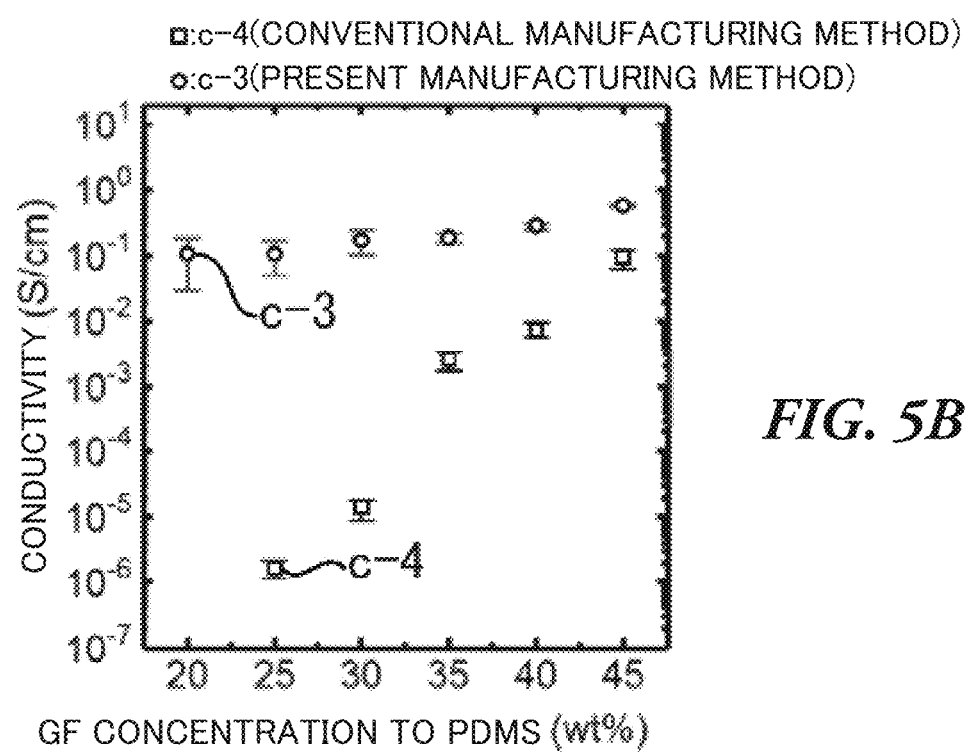

As illustrated in FIG. 5B, for each of the sensor by use of the conductive resin manufactured by the present manufacturing method using GF flakes as conductive materials (the plot c-3), and the sensor by use of the conductive resin manufactured by the conventional manufacturing method using GF flakes as conductive materials (the plot c-4), the conductivity (S/cm) of the conductive resin was raised as the GF concentration (wt %) to the PDMS was increased.

However, as illustrated in FIG. 5B, the sensor by use of the conductive resin manufactured by the present manufacturing method using GF flakes as conductive materials (the plot c-3) exhibited a higher conductivity (S/cm) of the conductive resin than that of the sensor by use of the conductive resin manufactured by the conventional manufacturing method using GF flakes as conductive materials (the plot c-4) at the same concentration (wt %).

Consequently, it is understood that the sensor by use of the conductive resin manufactured by the present manufacturing method provides a higher conductivity with a smaller amount of conductive materials than the sensor by use of the conductive resin manufactured by the conventional manufacturing method.

(4) Responsivity to Strain Displacement of Tensile Strain/Compressive Strain

FIGS. 6A-6F illustrate rate of change in electric resistance $\Delta R/R_0$(%) in response to the strain displacement (mm) of tensile strain/compressive strain of the sensor. The rate of change in electric resistance $\Delta R/R_0$ (C) represents the sensitivity of the sensor.

Figure 6B:
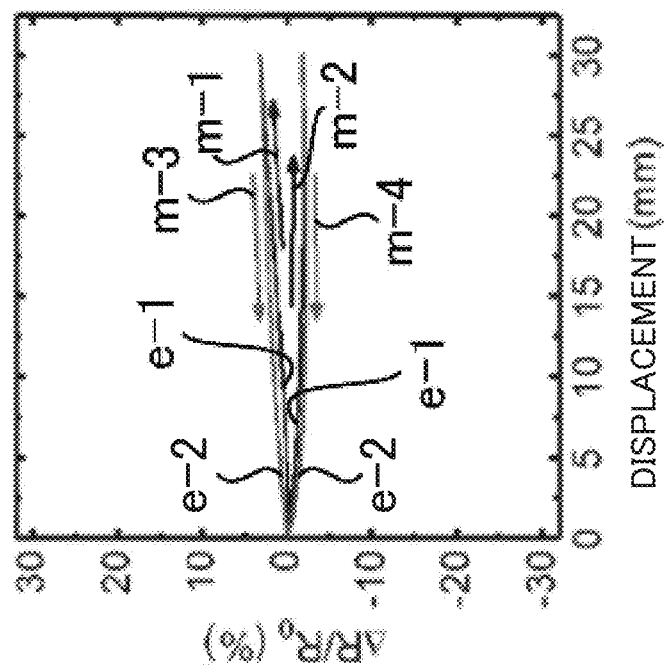
FIG. 6B illustrates a measurement result obtained by a sensor by use of the conductive resin manufactured by the conventional manufacturing method, where CB particles are used as conductive materials.
Figure 6A:
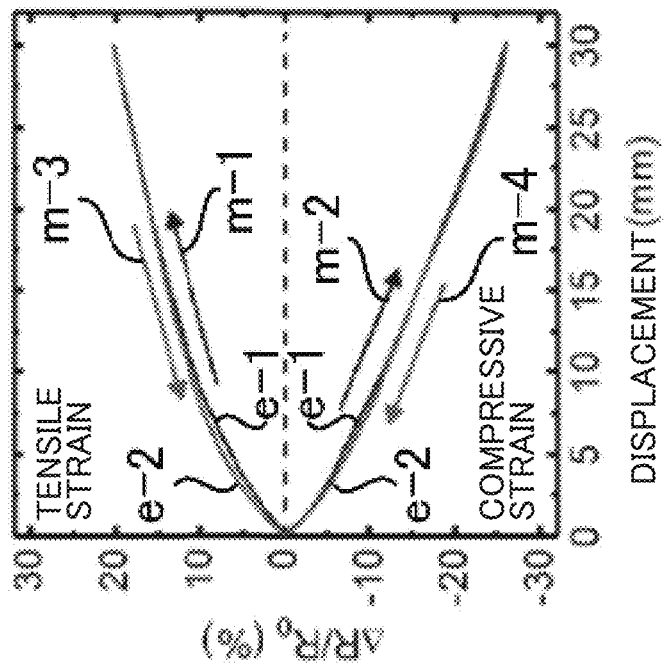
FIG. 6A illustrates a measurement result obtained by a sensor by use of the conductive resin manufactured by the present manufacturing method, where CB particles are used as conductive materials.

FIG. 6A illustrates a measurement result obtained by using the sensor by use of the conductive resin manufactured by the present manufacturing method using CB particles as conductive materials. FIG. 6B illustrates a measurement result obtained by using the sensor by use of the conductive resin manufactured by the conventional manufacturing method using CB particles as conductive materials. That is, FIGS. 6A and 6B illustrate the rate of change in electric resistance ($\Delta R/R_0$(%)) in response to the strain displacement (mm) in the tensile state and the rate of change in electric resistance ($\Delta R/R_0$(%)) in response to the strain displacement (mm) in the compressive state in the sensors, respectively.

Figure 6C:
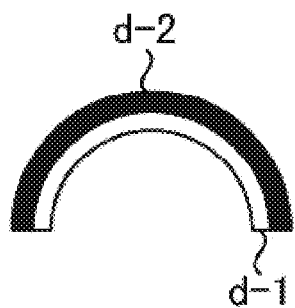
FIG. 6C illustrates tensile strain.
Figure 6D:
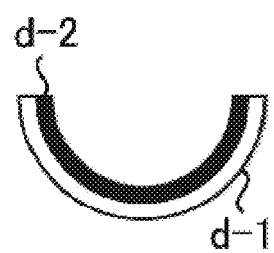
FIG. 6D illustrates compressive strain.
Figure 6E:
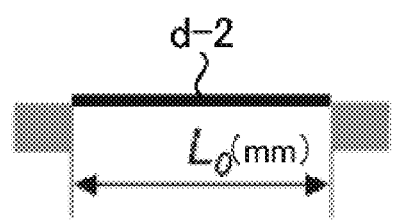
FIGS. 6E and 6F illustrate strain displacement.
Figure 6F:
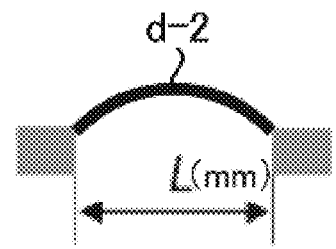

Here, "tensile strain" means that a conductive resin layer d-2 on a substrate d-1 bends to project to the opposite side of the substrate d-1 as illustrated in FIG. 6C, which occurs when the conductive resin layer d-2 is stretched. Meanwhile, "compressive strain" means that the conductive resin layer d-2 on the substrate d-1 bends to project to the substrate d-1 side as illustrated in FIG. 6D, which occurs when the conductive resin layer d-2 is compressed. In addition, "strain displacement (mm)" is a value obtained by subtracting length L (mm) of the conductive resin layer d-2 strained as illustrated in FIG. 6F from length $L_0$ (mm) of the conductive resin layer d-2 not strained (but flat), that is, strain displacement=$L_0$−L (mm), which represents the magnitude of strain (bending).

In each of FIGS. 6A and 6B, line e-1 represents the rate of change in electric resistance $\Delta R/R_0$(%) for each of the tensile strain and the compressive strain of the conductive resin layer of the sensor. In addition, line e-2 represents the rate of change in electric resistance $\Delta R/R_0$ (%) for each of the tensile strain and the compressive strain when the conductive resin layer of the sensor is recovered to be in the original flat state (without strain).

With the sensor by the present manufacturing method using CB illustrated in FIG. 6A, when the strain displacement (mm) of the tensile strain was increased as indicated by the line e-1, the rate of change in electric resistance $\Delta R/R_0$ (%) smoothly rose as indicated by arrow m-1. Meanwhile, the strain displacement (mm) of the compressive strain was increased as indicated by the line e-1, the rate of change in electric resistance $\Delta R/R_0$(%) smoothly fell as indicated by arrow m-2. In addition, with the sensor, when the strain displacement (mm) of the tensile strain was decreased as indicated by the line e-2, the rate of change in electric resistance $\Delta R/R_0$(%) smoothly fell to overlap the line e-1 as indicated by arrow m-3. Meanwhile, when the strain displacement (mm) of the compressive strain was decreased as indicated by the line e-2, the rate of change in electric resistance $\Delta R/R_0$(%) smoothly rose to overlap the line e-1 as indicated by arrow m-4.

With the sensor by the conventional manufacturing method using CB illustrated in FIG. 6B, when the strain displacement (mm) was increased for each of the tensile strain and the compressive strain as the line e-1, the rate of change in electric resistance $\Delta R/R_0$(%) was changed a little as indicated by arrows m-1 and m-2. Meanwhile, with the sensor, when the strain displacement (mm) was decreased for each of the tensile strain and the compressive strain as indicated by the line e-2, the rate of change in electric resistance $\Delta R/R_0$(%) was changed a little as indicated by arrows m-3 and m-4.

Consequently, the sensor (FIG. 6A) by use of the conductive resin manufactured by the present manufacturing method and having voids due to the phase separation structure has a higher sensitivity to the strain (bending) of the conductive resin than the sensor (FIG. 6B) by use of the conductive resin manufactured by the conventional manufacturing method in which there is no void and conductive materials are randomly dispersed.

(5) Sensitivity to Strain Value

Figure 7A:
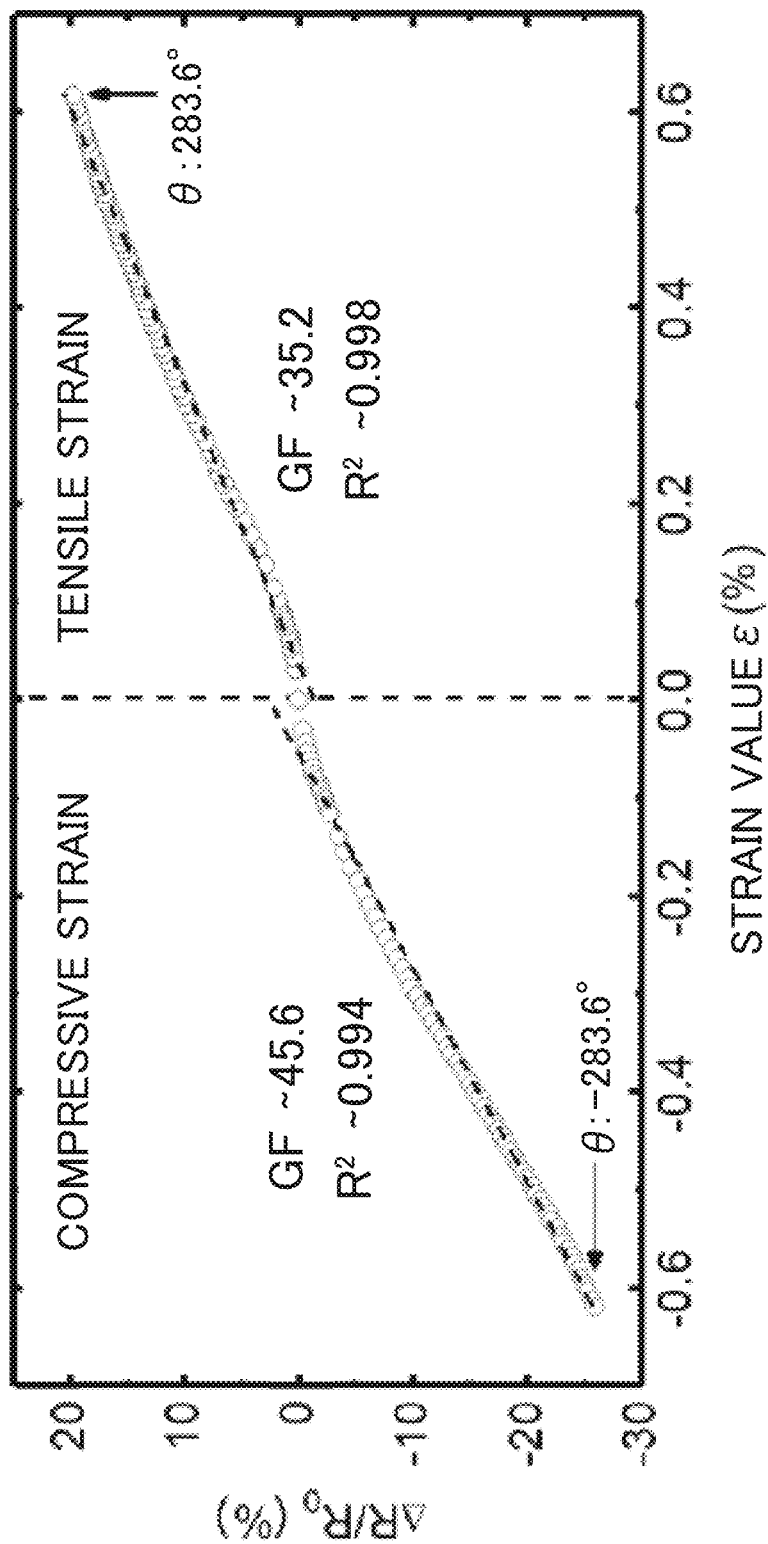
FIG. 7A illustrates rates of change in electric resistance $\Delta R/R_0$(%) (sensitivity) to strain values $\varepsilon$ (%) of the sensor by use of the conductive resin (use of CB) manufactured by the present manufacturing method.

FIG. 7A illustrates rates of change in electric resistance $\Delta R/R_0$(%) (sensitivity) to strain values ε (%) of the sensor by use of the conductive resin (use of CB) manufactured by the present manufacturing method.

Figure 7B:
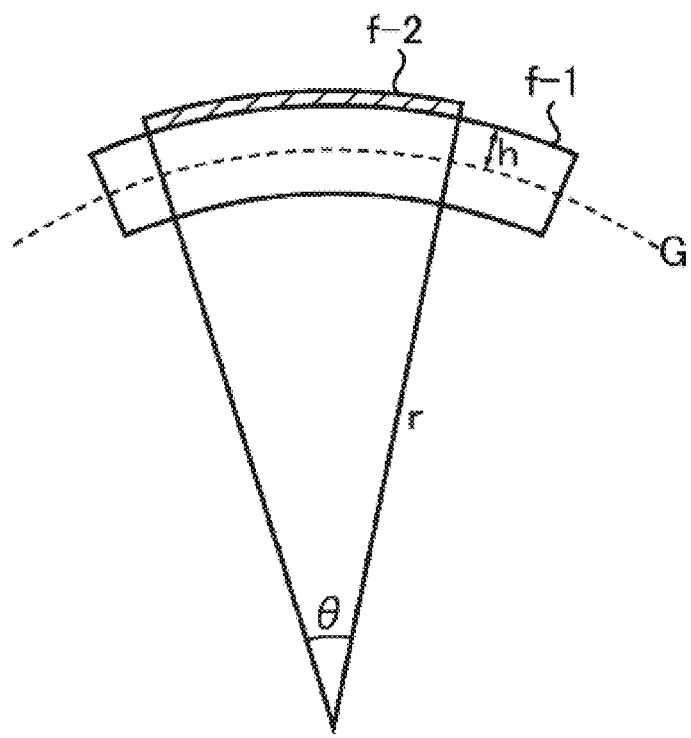
FIG. 7B illustrates the strain value $\varepsilon$(%)

Here, "strain value ε (%)" will be described with reference to FIG. 7B. As illustrated in FIG. 7B, h denotes a distance from neutral axis line G of a bent substrate (PDMS) f-1 to a conductive resin layer f-2. r denotes the radius of curvature of this bending (strain). In addition, θ denotes the central angle of the circular arc of the radius of curvature r formed by the bending (strain) of the conductive resin layer f-2. By using the distance h and the radius of curvature r, the strain value ε is represented as ε=±h/r (see Sheng Chen et al. Flexible and Anisotropic Strain Sensor Based on Carbonized Crepe Paper with Aligned Cellulose Fibers Advanced Functional Materials 2018, 28, 1802547). The entire contents of this disclosure are hereby incorporated by reference.

As illustrated in FIG. 7A, in a case where the conductive resin layer of the sensor had tensile strain, when θ was changed to increase the strain value ε (%) from 0.0(%) the rate of change in electric resistance $\Delta R/R_0$(%) was approximately linearly increased as the strain value ε (%) was increased (gauge factor (GF) (change in the resistance due to the strain):35.2). Meanwhile, in a case where the conductive resin layer of the sensor had compressive strain, when θ was changed to decrease the strain value ε (%) from 0.0(%), the rate of change in electric resistance $\Delta R/R_0$(%) was approximately linearly decreased as the strain value ε (%) was decreased (GF:45.6).

From FIG. 7A, it is recognized that for the sensor by use of the conductive resin (use of CB) manufactured by the present manufacturing method, the rate of change in electric resistance $\Delta R/R_0$(%) (sensitivity) is approximately linearly changed in response to the change of the strain value ε (%).

(6) Response Speed

Figure 8:
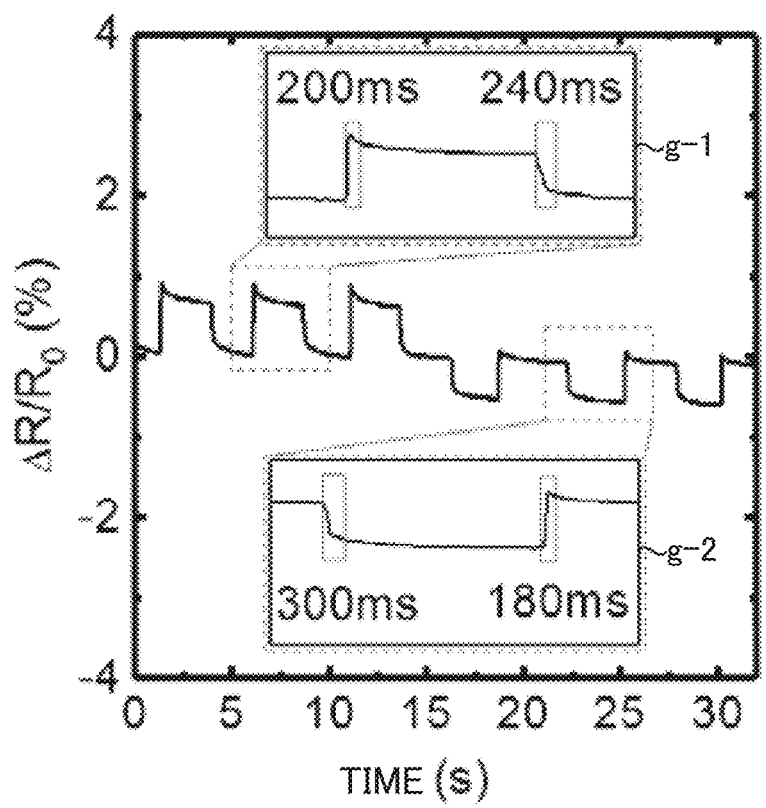
FIG. 8 illustrates a result of measuring the response speed of the sensor.

FIG. 8 illustrates the result of measuring the response speed of the sensor by use of the conductive resin (use of CB) manufactured by the present manufacturing method. As illustrated in range g-1 of FIG. 8, the response time for the tensile strain of the sensor was 200 ms, and the recovery time for which the tensile strain state was recovered to the flat state was 240 ms.

Meanwhile, as illustrated in range g-2 of FIG. 8, the response time for the compressive strain of the sensor was 300 ms, and the recovery time for which the compressive strain state was recovered to the flat state was 180 ms. Consequently, it is recognized that the response time of the sensor manufactured by the present manufacturing method is fast.

(7) Cycle Stability

Figure 9:
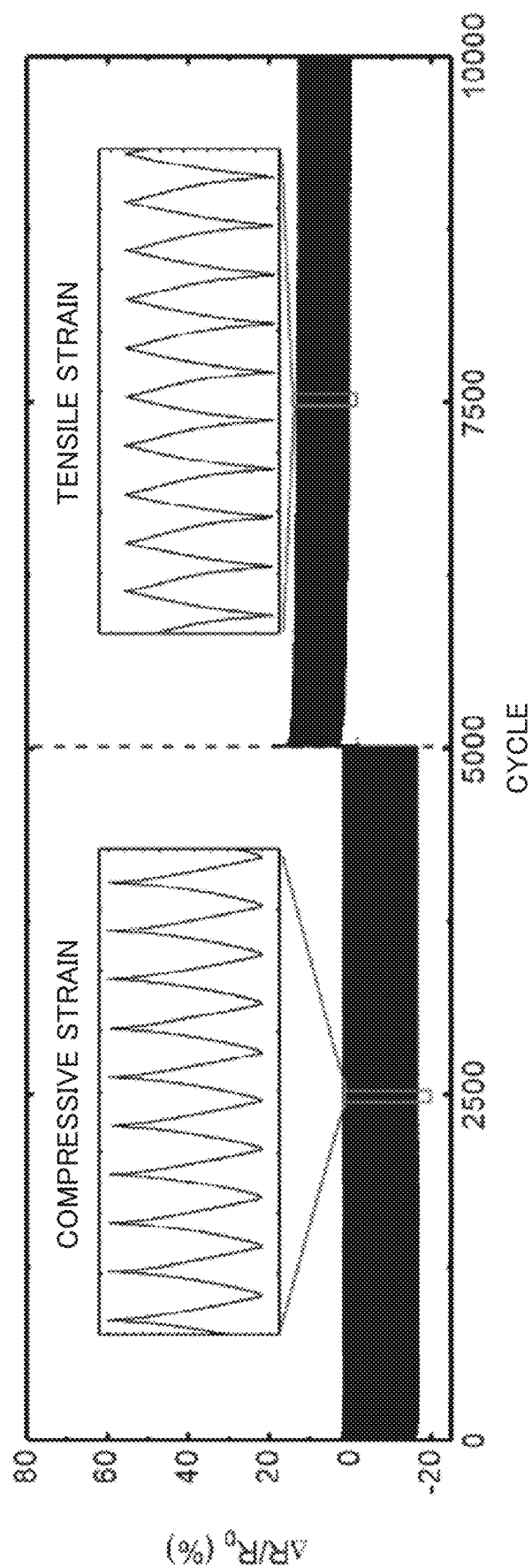
FIG. 9 illustrates rates of change in electric resistance $\Delta R/R_0$(%) with respect to compressive/tensile cycles of the sensor.

FIG. 9 illustrates the rate of change in electric resistance $\Delta R/R_0$(%) with respect to compressive/tensile cycles of the sensor by use of the conductive resin (use of CB) manufactured by the present manufacturing method. The conductive resin layer of the sensor was repeatedly placed in the compressive strain state from the flat state 5000 times, and then repeatedly placed in the tensile strain state from the flat state 5000 times. As illustrated in FIG. 9, it is recognized that the sensor has excellent cycle stability both when the sensor is repeatedly placed in the compressive strain state and when the sensor is repeatedly placed in the tensile strain state.

(8) Comparison of Gauge Factor (GF)

FIG. 10 is a table illustrating a comparison of gauge factors (GF) in the tensile state and the compressive state between the sensor by use of the conductive resin (use of PDMS and CB) manufactured by the present manufacturing method (printing) and sensors manufactured by other printed techniques and coating which have been reported: a sensor made of leather and CNT (carbon nanotube); a sensor made of MWCNT (multi-walled carbon nanotube); a sensor made of CNT, CB, and paper; a sensor made of carbonized cellulose; a sensor made of RGO (reduced graphene oxide) and paper; and a sensor made of PEDOT:PSS (poly(4-styrene sulfonate) doped poly(3,4-ethylenedioxythiophene)) and NW.

As illustrated in FIG. 10, it is recognized that the sensor by use of the conductive resin (use of PDMS and CB) manufactured by the present manufacturing method (printing) exhibits higher gauge factors (GF) both in the tensile state and the compressive state as compared to the sensors manufactured by other printed techniques and coating which have been reported.

(9) Monitoring of Hand Motion

Figures 11A, 11B:
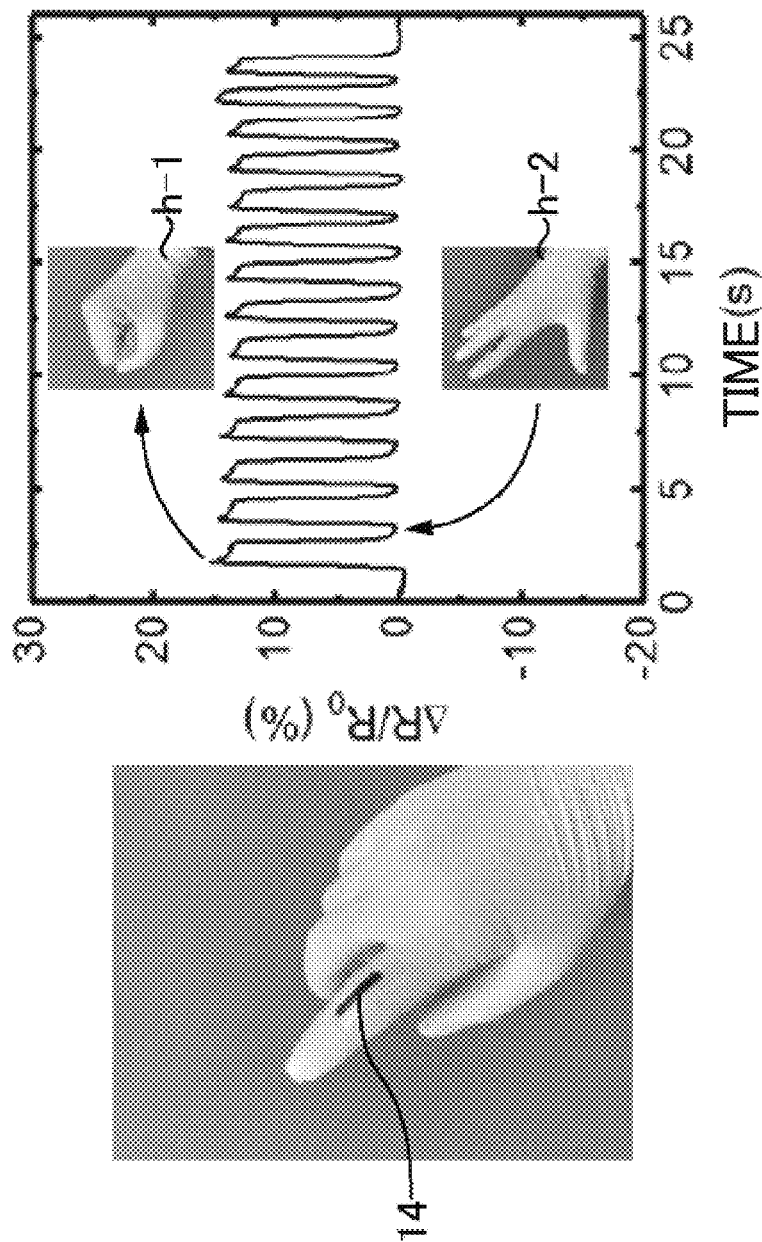
FIGS. 11A, 11B, 11C and 11D illustrate monitoring of hand motions by the sensor.

FIGS. 11A-11D illustrate monitoring of hand motions by the sensor by use of the conductive resin (use of CB) manufactured by the present manufacturing method. FIG. 11A illustrates a state where the sensor 14 manufactured by the present manufacturing method is put on the second joint of the forefinger of the human hand. FIG. 11B illustrates the rate of change in electric resistance $\Delta R/R_0$(%) (sensitivity) of the sensor 14 with respect to the time (s) for hand motions to repeatedly change between state h-1 where the right hand is closed (the sensor has tensile strain) and state h-2 where the right hand is open (the sensor is flat). In this way, the sensor 14 was put on the second joint of the forefinger to monitor the hand motions.

As illustrated in FIG. 11B, in the state h-1 where the hand is closed (the sensor has tensile strain), the rate of change in electric resistance $\Delta R/R_0$(%) rose, and in the state h-2 where the right hand is open (the sensor is flat), the rate of change in electric resistance $\Delta R/R_0$(%) was recovered to the initial value. Consequently, it is recognized that the sensor manufactured by the present manufacturing method can monitor the hand motions well.

Figure 11D:
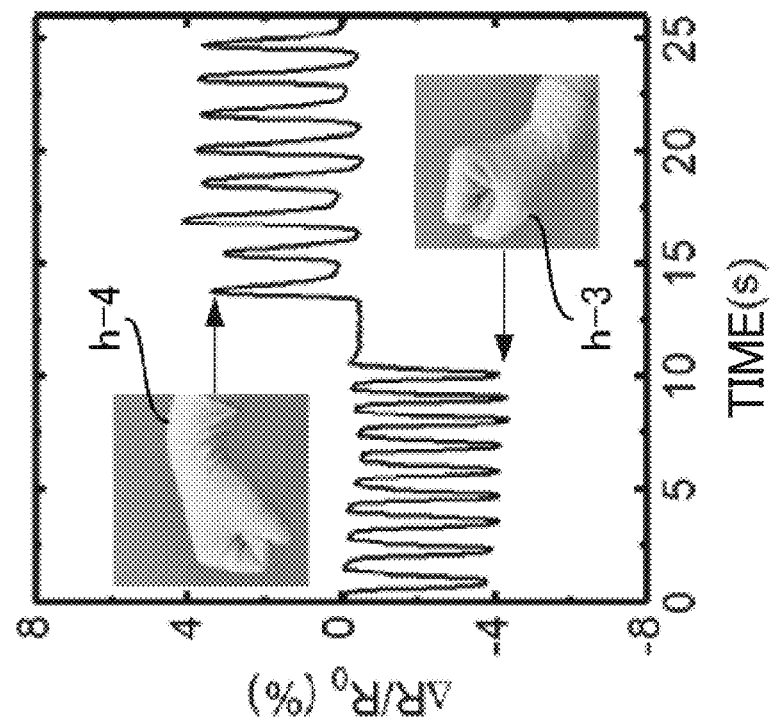
Figure 11C:
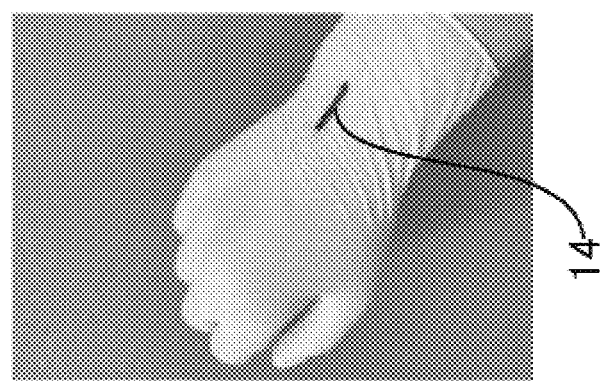

FIG. 11C illustrates a state where the sensor 14 by use of the conductive resin manufactured by the present manufacturing method is put on the wrist of the human hand. FIG. 11D illustrates the rate of change in electric resistance $\Delta R/R_0$(%) (sensitivity) of the sensor 14 with respect to the time (s) for wrist motions to repeatedly change between state h-3 where the closed hand is bent up (the sensor has compressive strain) and state h-4 where the closed hand is bent down (the sensor has tensile strain). In this way, the sensor was put on the wrist to monitor (observe) the motions of the wrist.

As illustrated in FIG. 11D, in the state h-3 where the closed hand was bent up (the sensor has compressive strain), the rate of change in electric resistance $\Delta R/R_0$(%) fell, and in the state h-4 where the closed hand is bent down (the sensor has tensile strain), the rate of change in electric resistance $\Delta R/R_0$(%) rose. Consequently, it is recognized that the sensor manufactured by the present manufacturing method can monitor the motions of the wrist and the motion directions well.

(10) Judgement of the Shape by Sensors

Figure 12:
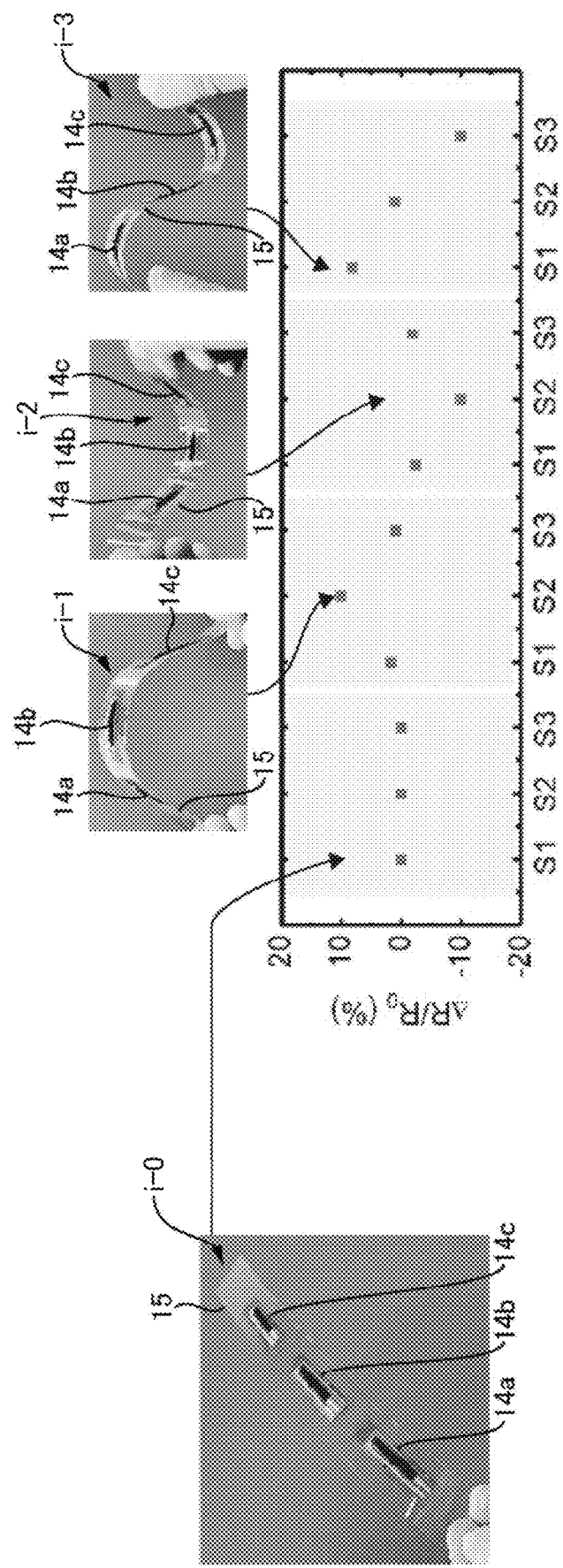
FIG. 12 illustrates judgement of the shape by using a plurality of sensors.

FIG. 12 illustrates judgement of the shape by using a plurality of sensors by use of the conductive resin (use of CB) manufactured by the present manufacturing method. As illustrated in FIG. 12, a substrate 15 on which sensors 14a, 14b and 14c are provided is in original state i-0 where the substrate 15 is not bent but flat, and when the state of the substrate 15 is changed to: bending state i-1 where the substrate 15 is bent to make the sensor 14b the most convex; bending state i-2 where the substrate 15 is bent to make the sensor 14b the most concave; and bending state i-3 where the substrate 15 is bent to make the sensor 14a the most convex and make the sensor 14c the most concave, it is recognized that the rates of change in electric resistance $\Delta R/R_0$(%) correspond to the bending state i-1, the bending state i-2, and the bending state i-3, respectively. Consequently, by putting a plurality of sensors manufactured by the present manufacturing method on a subject in a relatively large size, it is possible to judge the shape of the subject well.

(11) Responsivity to Bending Motion of Robot Gripper

Figure 13A:
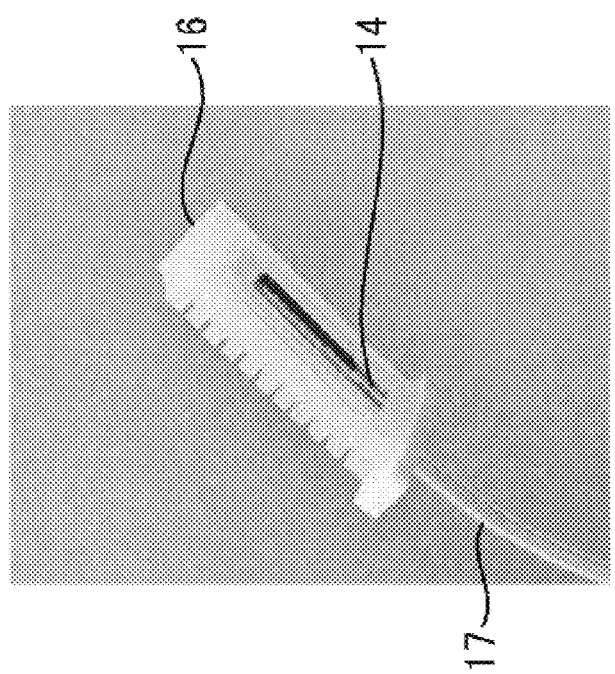
FIGS. 13A and 13B illustrate sensing of the bending motions of a robot gripper by the sensor.
Figure 13B:
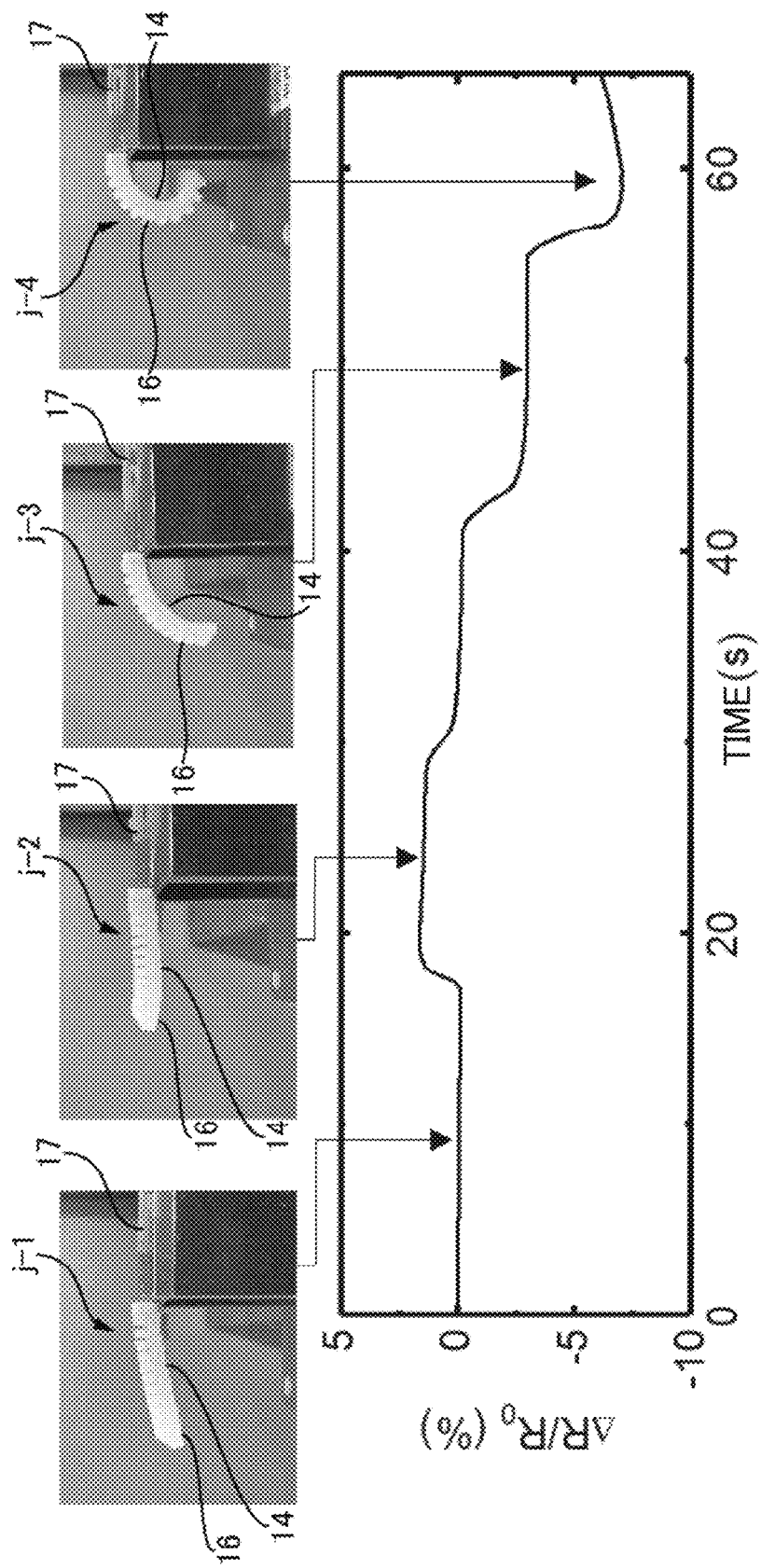

FIGS. 13A and 13B illustrate sensing of the bending motions of a robot gripper by the sensor by use of the conductive resin (use of CB) manufactured by the present manufacturing method. As illustrated in FIG. 13A, a robot gripper 16 with the sensor 14 by use of the conductive resin manufactured by the present manufacturing method is supported by a support 17. As illustrated in FIG. 13B, when the state of the robot gripper 16 was changed from state j-1 where the robot gripper 16 was not bent but flat to bending state j-2, bending state j-3, and bending state j-4 in sequence, the rate of change in electric resistance $\Delta R/R_0$(%) was changed in response to the bending state j-2, the bending state j-3, and the bending state j-4. Consequently, the sensor 14 by use of the conductive resin manufactured by the present manufacturing method exhibits a good responsivity to the bending motions of the robot gripper 16, and therefore, it is understood that the sensor 14 can sense the bending state of the robot gripper 16.

(12) Sensitivity to Pressure

Figure 14A:
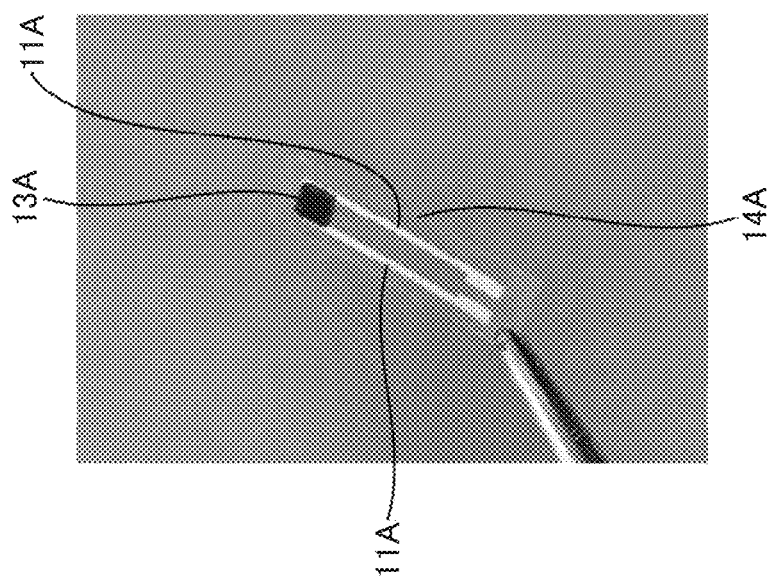
FIGS. 14A and 14B illustrate sensing by the sensor, where the rate of change in electric resistance with respect to the pressure applied to the sensor is sensed.
Figure 14B:
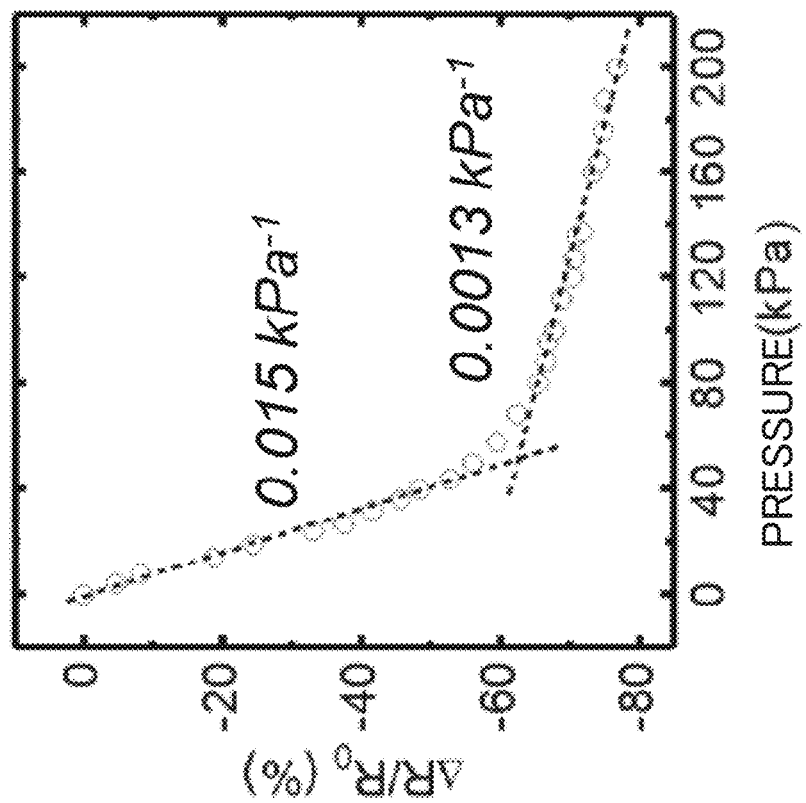

FIGS. 14A and 14B illustrate sensing by the sensor by use of the conductive resin (use of CB) manufactured by the present manufacturing method, where the rate of change in electric resistance $\Delta R/R_0$(%) with respect to the pressure (kPa) applied to the sensor is sensed. A sensor 14A by use of the conductive resin manufactured by the present manufacturing method includes a conductive resin layer 13A in a shape illustrated in FIG. 14A between silver electrode members 11A. The conductive resin layer 13A of the sensor 14A was pressed.

As illustrated in FIG. 14B, when the pressure (kPa) was raised by pressing the conductive resin layer 13A, the rate of change in electric resistance $\Delta R/R_0$(%) was changed approximately linearly with an inclination of 0.015 kPa$^{-1}$ until the pressure was about 45 kPa, and, when the pressure was raised further than that, the rate of change in electric resistance $\Delta R/R_0$(%) was changed approximately linearly with an inclination of 0.0013 kPa. Consequently, it is recognized that the sensitivity of the sensor 14A to the pressure is changed approximately linearly with two different inclinations as illustrated in FIG. 14B.

(13) Responsivity Depending on Pressing Force

FIGS. 15A and 15B illustrate the responsivity of the sensor by use of the conductive resin (use of CB) manufactured by the present manufacturing method depending on different pressing forces. FIG. 15A illustrates a state where the sensor 14A illustrated in FIG. 14A is put on the inside of the tip of the forefinger of the human hand. This forefinger contacted the thumb to apply different pressing forces (a low pressure and a high pressure) to the conductive resin layer 13A of the sensor 14A respectively three times. As illustrated in FIG. 15B, the rate of change in electric resistance $\Delta R/R_0$(%) of the sensor 14A when the forefinger contacted the thumb at a high pressure was more greatly changed than when the forefinger contacted the thumb at a low pressure. Consequently, it is recognized that the sensor 14A exhibits a good responsivity depending on the pressing force of the hand.

(14) Responsivity of Pulse Sensor

FIGS. 16A and 16B illustrate responsivity of the sensor by use of the conductive resin (use of CB) manufactured by the present manufacturing method, where the sensor is used as a pulse sensor. FIG. 16A illustrates a state where the sensor 14A illustrated in FIG. 14A is put on the radial artery at a position of 1 to 2 cm under the wrist on the extended line of the forefinger of the human hand. FIG. 16B illustrates the result of measuring the pulse of a person by the sensor 14A in this state. As illustrated in FIG. 16B, it is recognized that the sensor 14A can sense minute changes such as pulse changes, and clearly take pulse waves. In addition, four points ($P_s$, $P_i$, $P_T$, $P_0$) were sensed in one pulse wave. Consequently, the sensor 14A is applicable as a sensor not only to take the pulse but also to acquire biological information such as the blood pressure and the stress.

(15) Responsivity to Gripping Motion of Robot

Figures 17A, 17B:
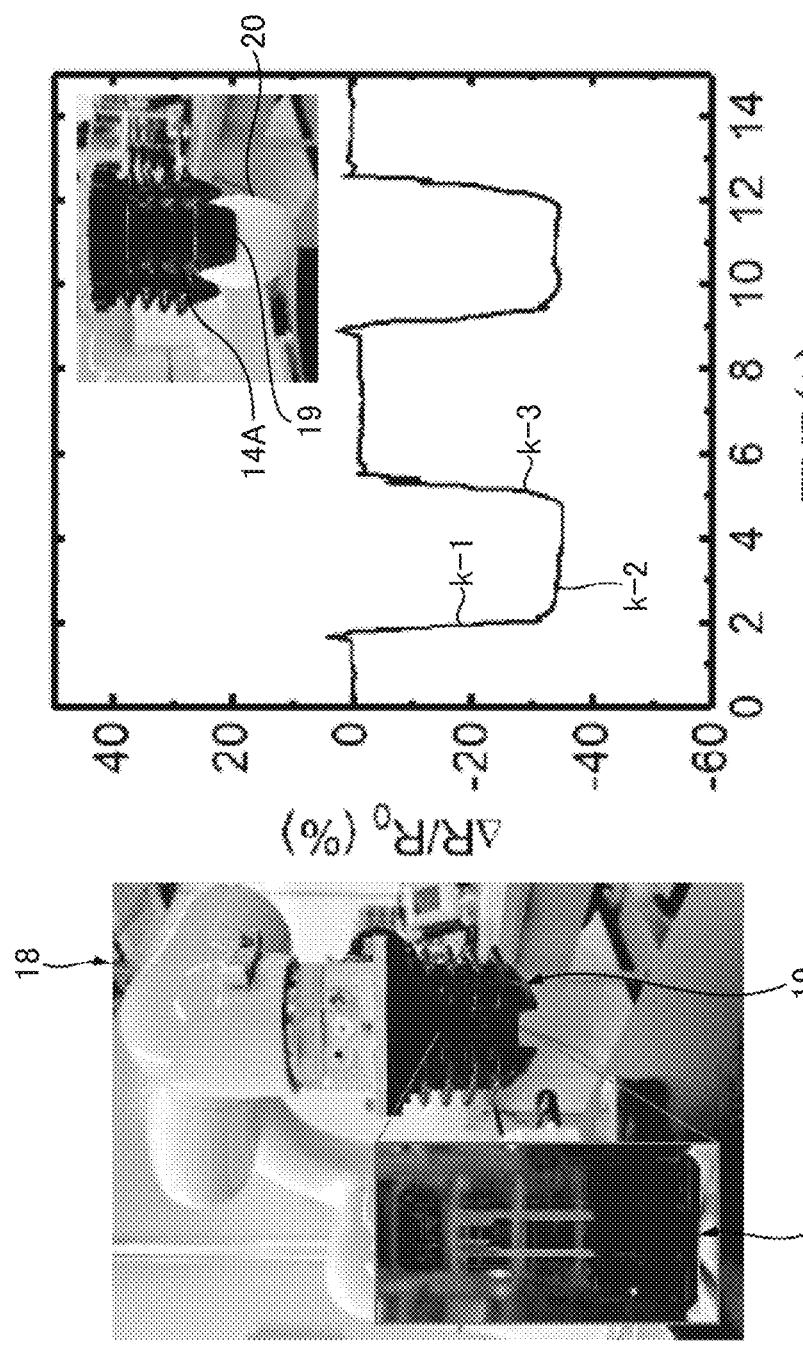
FIGS. 17A and 17B illustrate the responsivity when the sensor is provided in a gripping robot.

FIGS. 17A and 17B illustrate the responsivity of the sensor by use of the conductive resin (use of CB) manufactured by the present manufacturing method, which is provided on a gripping robot. A robot 18 illustrated in FIG. 17A includes a plurality of gripping members 19 to grip objects. The sensor 14A illustrated in FIG. 14A is provided on the gripping members 19.

FIG. 17B illustrates the responsivity (sensitivity) of the sensor 14A when the gripping members 19 of the robot 18 grip (hold) an egg 20. When the gripping members 19 of the robot 18 gripped the egg 20, the pressure was applied to the sensor 14A, and therefore the rate of change in electric resistance ($\Delta R/R_0$(%)) fell from the initial value of 0% (k-1 and k-2 of FIG. 17B). After that, when the gripping members 19 of the robot 18 released the egg 20, no pressure was applied to the sensor 14A, and therefore the rate of change in electric resistance ($\Delta R/R_0$(%)) was recovered to the initial value of 0% (k-3 of FIG. 17B). When these motions of the robot 18 were repeated, the same measurement result was obtained. Consequently, it is recognized that the sensor 14A exhibits a good responsivity to the gripping motion of the robot.

(16) Sensitivity to Stretching Rate

Figure 18:
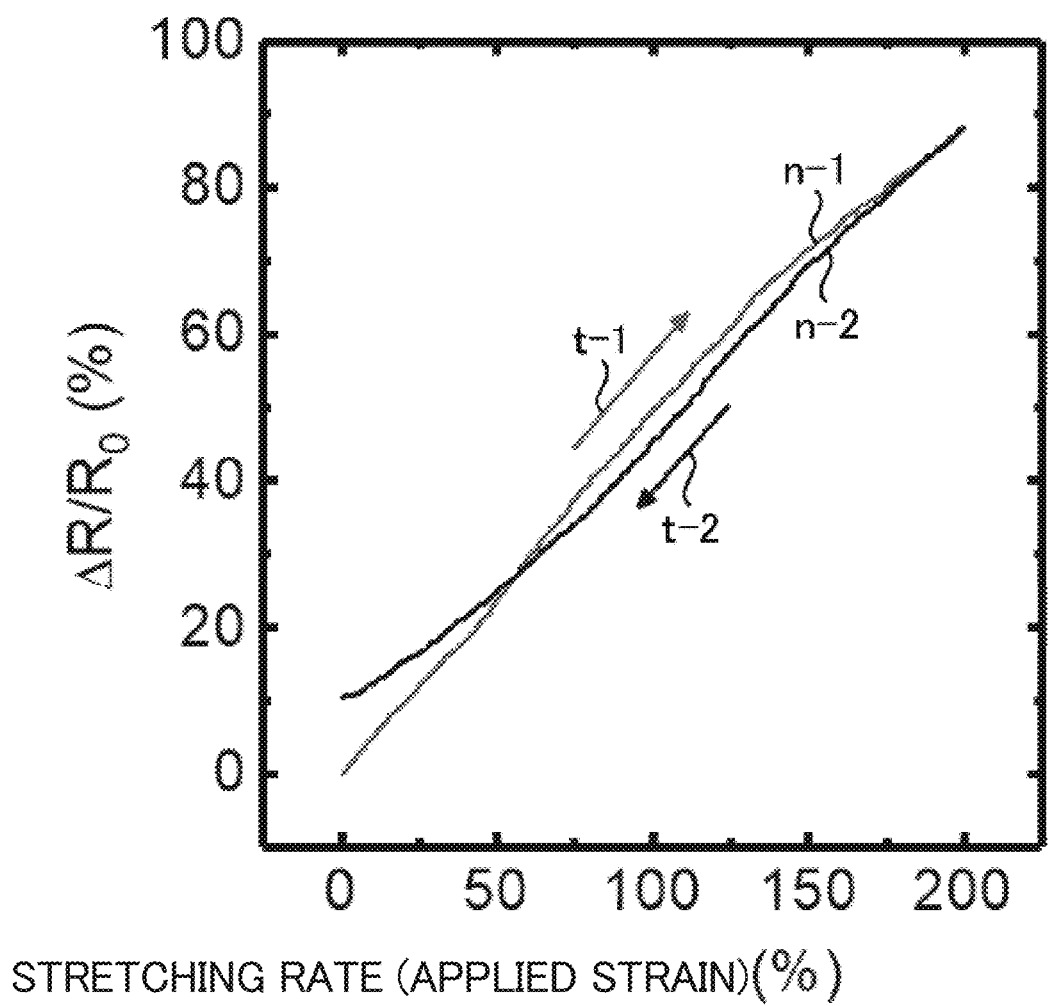
FIG. 18 illustrates rates of change in electric resistance of the sensor by use of the conductive resin with respect to the stretching rate of the conductive resin.

FIG. 18 illustrates rates of change in electric resistance $\Delta R/R_0$(%) (sensitivity) of the sensor by use of the conductive resin (use of CB) manufactured by the present manufacturing method with respect to the stretching rate (%) of the conductive resin. In FIG. 18, line n-1 denotes the rate of change in electric resistance $\Delta R/R_0$(%) (sensitivity) when the stretching rate (%) of the conductive resin is increased as indicated by arrow t-1. Line n-2 denotes the rate of change in electric resistance $\Delta R/R_0$(%) (sensitivity) when the stretching rate (%) of the conductive resin is decreased as indicated by arrow t-2.

Here, as described above about the stretching rate U, provided that the length of the conductive resin before being stretched is $M_0$, and the length of the conductive resin after being stretched is M (in the stretch direction), it is defined as the stretching rate $=(M-M_0)/M_0 \times 100$(%).

For the sensor by use of the conductive resin (use of CB) manufactured by the present manufacturing method, when the stretching rate (%) of the conductive resin was increased, the rate of change in electric resistance $\Delta R/R_0$(%) smoothly rose as indicated by the arrow t-1. Meanwhile, for the sensor, when the stretching rate (%) of the conductive resin was decreased, the rate of change in electric resistance $\Delta R/R_0$(%) smoothly fell as indicated by the arrow t-2. Consequently, it is recognized that the sensor exhibits a good responsivity to the stretching and shrinking of the conductive resin.

Moreover, as illustrated in FIG. 18, it is recognized that the conductive resin (use of CB) manufactured by the present manufacturing method has stretchability of a stretching rate of 200% to smoothly recover to have the original length.

In contrast, the conductive resin manufactured by the conventional manufacturing method cannot be stretched up to the stretching rate of 200%, but is cut halfway, and moreover, the stretched conductive resin cannot be recovered to have the original length. That is, the conducive resin manufactured by the present manufacturing method has an excellent stretchability compared to the conductive resin manufactured by the conventional manufacturing method.

According to the invention, it is possible to provide conductive resin capable of preventing an increase in the manufacturing cost, a manufacturing method for manufacturing the conductive resin, and a sensor including the conductive resin.

The invention claimed is:

1. A manufacturing method for manufacturing conductive resin comprising:
   mixing a hydrogen bond donor compound and a hydrogen bond acceptor compound to produce deep eutectic liquid (DEL);
   adding conductive materials to the DEL to produce gel;
   adding resin that is insoluble in the DEL to the gel to produce ink made of the gel dispersed in the resin;
   forming the produced ink into a formed object having a desired shape;
   curing the resin in the formed object; and
   evaporating the DEL in the formed object including the cured resin to produce porous conductive resin.

2. The manufacturing method for manufacturing conductive resin according to claim 1, wherein the formed object is formed by printing the ink on a substrate.

* * * * *